US011838947B2

(12) United States Patent
Luo et al.

(10) Patent No.: US 11,838,947 B2
(45) Date of Patent: Dec. 5, 2023

(54) NETWORK CONTROLLED REPEATER OPERATION AT NEW RADIO-UNLICENSED BAND

(71) Applicant: QUALCOMM Incorporated, San Diego, CA (US)

(72) Inventors: Jianghong Luo, Skillman, NJ (US); Xiaoxia Zhang, San Diego, CA (US); Jing Sun, San Diego, CA (US); Navid Abedini, Basking Ridge, NJ (US); Tao Luo, San Diego, CA (US); Naeem Akl, Somerville, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/362,690

(22) Filed: Jun. 29, 2021

(65) Prior Publication Data

US 2022/0417989 A1 Dec. 29, 2022

(51) Int. Cl.
*H04W 74/08* (2009.01)
*H04W 16/14* (2009.01)
*H04W 72/23* (2023.01)

(52) U.S. Cl.
CPC ....... *H04W 74/0808* (2013.01); *H04W 16/14* (2013.01); *H04W 72/23* (2023.01)

(58) Field of Classification Search
CPC . H04W 74/0808; H04W 16/14; H04W 72/23; H04W 88/04; H04W 74/006; H04B 7/15535
See application file for complete search history.

(56) References Cited

U.S. PATENT DOCUMENTS

| 2019/0313451 | A1* | 10/2019 | Liu | H04W 72/0446 |
| 2020/0351669 | A1* | 11/2020 | Xu | H04W 72/56 |
| 2020/0383149 | A1* | 12/2020 | Rico Alvarino | H04W 72/23 |
| 2021/0037503 | A1* | 2/2021 | Nam | H04W 72/0446 |

(Continued)

FOREIGN PATENT DOCUMENTS

WO  WO-2011121575 A2 *  10/2011  ......... H04B 7/15542

OTHER PUBLICATIONS

Al-Dulaimi et al., "5G Communications Race Pursuit of More Capacity Triggers LTE in Unlicensed Band", Feb. 24, 2015, IEEE Vehicular Technology Magazine, pp. 43-51. (Year: 2015).*

*Primary Examiner* — Michael K Phillips
(74) *Attorney, Agent, or Firm* — Norton Rose Fulbright US LLP

(57) ABSTRACT

This disclosure provides systems, methods, and devices for wireless communication that support network controlled repeater operation at new radio—unlicensed (NRU) bands. The network controlled repeater operations include receipt of a scheduling message from a serving base station that identifies an amplify and forward (AF) window and an offset prior to a beginning of the AF window. The relay node performs a listen before talk (LBT) procedure on a shared communication channel within the offset. In response to the result of the LBT, the relay node either refrains from AF operations within the AF window in response to failure of the LBT procedure or performs the AF operations on all received signals during the AF window in response to success of the LBT procedure. Other aspects and features are also claimed and described.

30 Claims, 19 Drawing Sheets

(56) References Cited

U.S. PATENT DOCUMENTS

2023/0063943 A1* 3/2023 Ding ................. G06F 9/526
2023/0129493 A1* 4/2023 Kiilerich Pratas .... H04L 5/0057
　　　　　　　　　　　　　　　　　　　370/235

* cited by examiner

NETWORK CONTROLLED REPEATER OPERATION AT NEW RADIO-UNLICENSED BAND

TECHNICAL FIELD

Aspects of the present disclosure relate generally to wireless communication systems, and more particularly, to wireless fifth generation (5G) new radio, unlicensed (NRU) operations. Some features may enable and provide improved communications, including network controlled repeater operation at NR-U bands.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by the relay node, a scheduling message from a serving base station, wherein the scheduling message identifies an amplify and forward (AF) window and an offset prior to a beginning of the AF window, performing, by the relay node, a listen before talk (LBT) procedure on a shared communication channel, wherein the LBT procedure is performed within the offset before the AF window, refraining, by the relay node, from AF operations within the AF window in response to failure of the LBT procedure, and performing, by the relay node, the AF operations on all received signals during the AF window in response to success of the LBT procedure.

In an additional aspect of the disclosure, a method of wireless communication includes successfully performing, by the base station, an LBT procedure to establish a COT, transmitting, by the base station, a scheduling message to a relay node, wherein the scheduling message identifies an AF window and an offset prior to a beginning of the AF window, and transmitting, by the base station, downlink signals to the relay node, wherein the downlink signals are transmitted after a gap period scheduled to allow a relay station LBT procedure.

In an additional aspect of the disclosure, a method of wireless communication includes obtaining, by the UE, an indication of AF operations for communications through a relay node, receiving, by the UE, an uplink transmission grant allocating uplink resources, and transmitting, by the UE, uplink signals to the relay node, wherein the uplink signals are transmitted after a gap period scheduled to allow a relay station LBT procedure.

In an additional aspect of the disclosure, an apparatus configured for wireless communication is disclosed. The apparatus includes at least one processor, and a memory coupled to the at least one processor. The at least one processor is configured to receive, by the relay node, a scheduling message from a serving base station, wherein the scheduling message identifies an AF window and an offset prior to a beginning of the AF window, to perform, by the relay node, an LBT procedure on a shared communication channel, wherein the LBT procedure is performed within the offset before the AF window, to refrain, by the relay node, from AF operations within the AF window in response to failure of the LBT procedure, and to perform, by the relay node, the AF operations on all received signals during the AF window in response to success of the LBT procedure.

In an additional aspect of the disclosure, an apparatus configured for wireless communication is disclosed. The apparatus includes at least one processor, and a memory coupled to the at least one processor. The at least one processor is configured to successfully perform, by the base station, an LBT procedure to establish a COT, to transmit, by the base station, a scheduling message to a relay node, wherein the scheduling message identifies an AF window and an offset prior to a beginning of the AF window, and to transmit, by the base station, downlink signals to the relay node, wherein the downlink signals are transmitted after a gap period scheduled to allow a relay station LBT procedure.

In an additional aspect of the disclosure, an apparatus configured for wireless communication is disclosed. The apparatus includes at least one processor, and a memory coupled to the at least one processor. The at least one processor is configured to obtain, by the UE, an indication of AF operations for communications through a relay node, to receive, by the UE, an uplink transmission grant allocating uplink resources, and to transmit, by the UE, uplink signals to the relay node, wherein the uplink signals are transmitted after a gap period scheduled to allow a relay station LBT procedure.

In an additional aspect of the disclosure, an apparatus configured for wireless communication is disclosed. The apparatus includes means for receiving, by the relay node, a scheduling message from a serving base station, wherein the scheduling message identifies an AF window and an offset prior to a beginning of the AF window, means for performing, by the relay node, an LBT procedure on a shared communication channel, wherein the LBT procedure is performed within the offset before the AF window, means for refraining, by the relay node, from AF operations within the AF window in response to failure of the LBT procedure, and means for performing, by the relay node, the AF operations on all received signals during the AF window in response to success of the LBT procedure.

In an additional aspect of the disclosure, an apparatus configured for wireless communication is disclosed. The apparatus includes means for successfully performing, by the base station, an LBT procedure to establish a COT, means for transmitting, by the base station, a scheduling message to a relay node, wherein the scheduling message identifies an AF window and an offset prior to a beginning of the AF window, and means for transmitting, by the base station, downlink signals to the relay node, wherein the downlink signals are transmitted after a gap period scheduled to allow a relay station LBT procedure.

In an additional aspect of the disclosure, an apparatus configured for wireless communication is disclosed. The apparatus includes means for obtaining, by the UE, an indication of AF operations for communications through a relay node, means for receiving, by the UE, an uplink transmission grant allocating uplink resources, and means for transmitting, by the UE, uplink signals to the relay node, wherein the uplink signals are transmitted after a gap period scheduled to allow a relay station LBT procedure.

In an additional aspect of the disclosure, a non-transitory computer-readable medium stores instructions that, when executed by a processor, cause the processor to perform operations including receiving, by the relay node, a scheduling message from a serving base station, wherein the scheduling message identifies an AF window and an offset prior to a beginning of the AF window, performing, by the relay node, an LBT procedure on a shared communication channel, wherein the LBT procedure is performed within the offset before the AF window, refraining, by the relay node, from AF operations within the AF window in response to failure of the LBT procedure, and performing, by the relay node, the AF operations on all received signals during the AF window in response to success of the LBT procedure.

In an additional aspect of the disclosure, a non-transitory computer-readable medium stores instructions that, when executed by a processor, cause the processor to perform operations including successfully performing, by the base station, an LBT procedure to establish a COT, transmitting, by the base station, a scheduling message to a relay node, wherein the scheduling message identifies an AF window and an offset prior to a beginning of the AF window, and transmitting, by the base station, downlink signals to the relay node, wherein the downlink signals are transmitted after a gap period scheduled to allow a relay station LBT procedure.

In an additional aspect of the disclosure, a non-transitory computer-readable medium stores instructions that, when executed by a processor, cause the processor to perform operations including obtaining, by the UE, an indication of AF operations for communications through a relay node, receiving, by the UE, an uplink transmission grant allocating uplink resources, and transmitting, by the UE, uplink signals to the relay node, wherein the uplink signals are transmitted after a gap period scheduled to allow a relay station LBT procedure.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
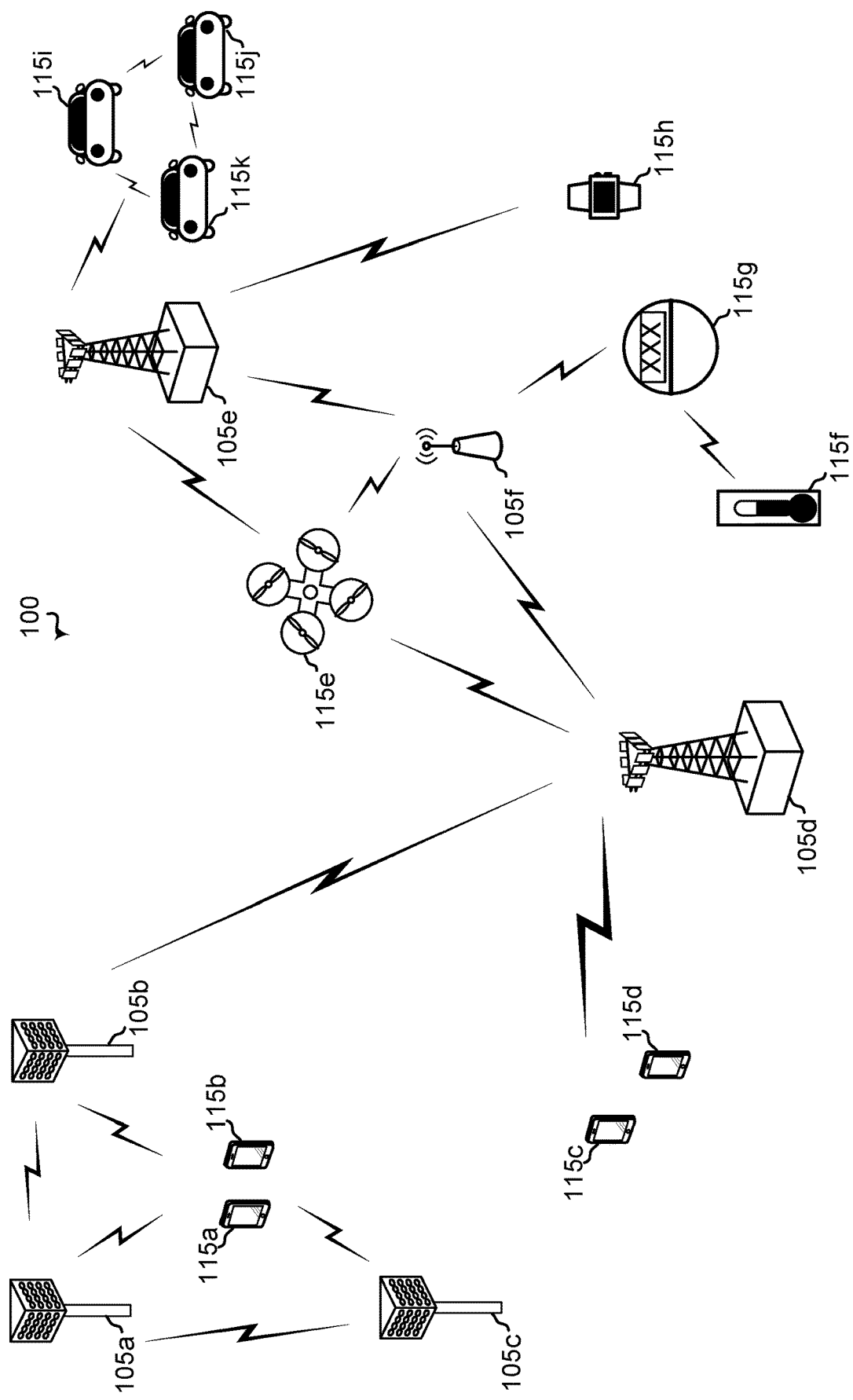
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support network controlled repeater operation at new radio—unlicensed (NRU) bands according to one or more aspects. Particular implementations of the subject matter described in this disclosure may be implemented to realize one or more of the following potential advantages or benefits. In some aspects, the present disclosure provides techniques for network controlled repeater operation at NRU bands. The example aspects allow for repeater or relay node-enabled communications between base stations and UEs to minimize or avoid the repeater or relay node amplifying noise or interference that would be present when the transmissions of the base station or UE are gated off or prevented due to LBT failure.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
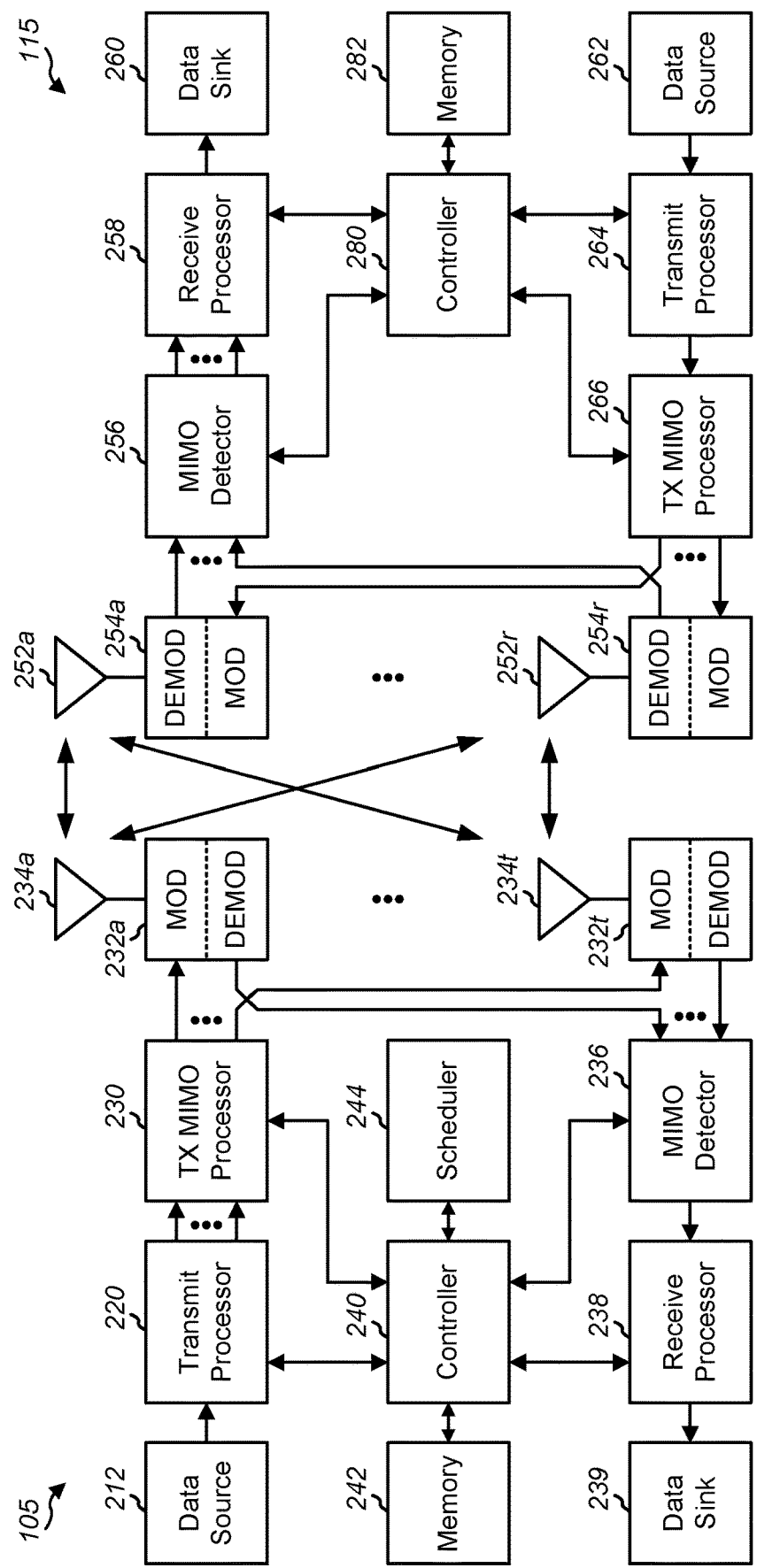
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4A-4C, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, bandwidth, or channel, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-μs, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-μs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Operators design wireless systems to provide service within certain areas using a reasonably efficient number of base stations. However, in some circumstances, either due to changes in geography or building of structures, or where new service may be desired in more remote regions of a location, additional means may be implemented in order to improve coverage of the desired area. One solution for improving coverage is for the operator to construct and enable new base stations. Repeater or relay nodes are an alternative solution that represent a simple and cost-effective way to improve network coverage. A repeater or relay node uses amplify-and-forward (AF) operations for communications between two wireless nodes, e.g., between a base station and a UE. There are various types of repeaters that have different capabilities for AF operations. One type may simply amplify the received signal and forward the amplified signal. Other types may decode the received signal and forward the decoded signals (e.g., integrated access and backhaul (IAB) nodes). Other types of repeater or relay nodes may further use side information to improve the performance of node, e.g., timing information, such as slot, symbol, subframe, frame boundary, time division duplex (TDD) uplink/downlink configuration, ON-OFF scheduling, spatial information for beam management, and the like.

Traditional repeaters operate without any side information. Autonomous smart repeaters may acquire or infer at least part of the side information. For example, an autonomous smart repeater can acquire the side information by receiving or decoding certain broadcast channels. A network-controlled repeater can be configured or controlled with side information provided by a network control node, such as a base station, via an established control interface. For example, all side information may be provided or controlled by a base station in communication with the network-controlled repeater. Certain types of network-controlled repeaters may use a combination of side information received directly from the base station and side information acquired or inferred by the repeater. This hybrid type of network-controlled repeater may, thus, reduce control overhead and/or latency.

Figure 3:
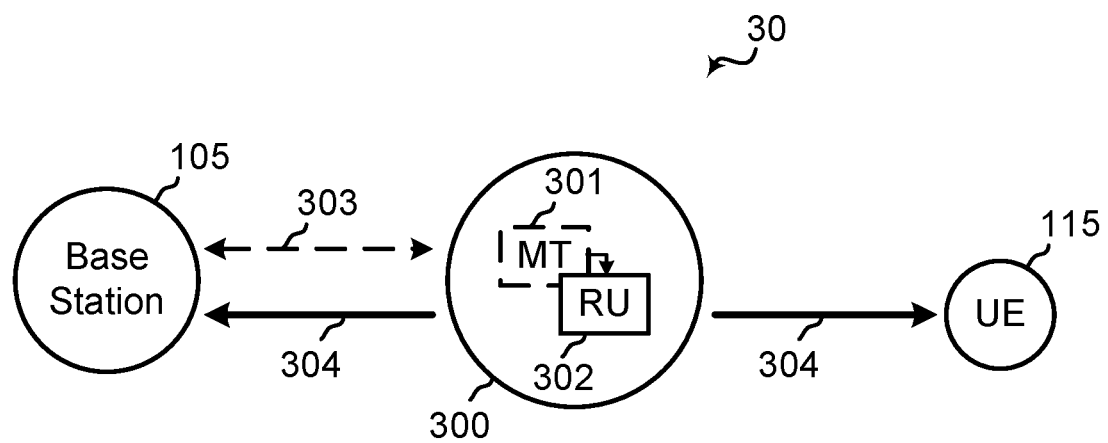
FIG. 3 is a block diagram of an example relay node configured as a network-controlled repeater for communications at NRU bands between a base station and UE.

FIG. 3 is a block diagram of an example relay node 300 configured as a network-controlled repeater for communications at NRU bands between a base station 105 and UE 115. Relay node 300 includes a mobile termination (MT) unit 301, which provides features, such as radio transmission and handover, speech encoding and decoding, error detection and correction, and signaling, and a remote unit (RU) 302, which provides the AF operation capability of relay node 300. Base station 105 provides control information via control path 303, which may also be referred to as the fronthaul link. Control path 303 carries control signals to configure relay node 300 using a control message, such as a downlink control information (DCI) format for repeaters and relay nodes (e.g., DCI format 2Rptr). The control message would include information on the time window for AF operation, downlink/uplink direction, beam direction on the service side, and the like.

It should be noted that a repeater or relay node may operate normally using sufficient information for its AF operation, without regard to any detailed scheduling grant information on the associated UE.

The AF operation for relaying signals received from either the base station or UE may be enabled by RU 302 via data path 304. Data path 304, which may also be referred to as the access link, carries the uplink/downlink signals from/to UEs, such as UE 115. Data path 304 is a pass through operation, via RU 302, that is controlled by base station 105 via control path 303.

Repeaters or relays, such as relay node 300, may operate within NRU networks over different frequency ranges (e.g., FR1, FR2, etc.). NRU operations below 6 GHz may be configured for load-based LBT procedures initiated by base stations, such as base station 105, or UEs, such as UE 115, using a Type 1 LBT procedure. In a channel occupancy time (COT) sharing operation, in which one wireless node (e.g., base station or UE) shares a COT that it reserved using a Type 1 LBT procedure with other wireless nodes (e.g., base station or UE), which may reserve available transmission opportunities within the shared COT using a Type 2 LBT procedure.

As indicated previously, a Type 1 LBT procedure may include a random count-down procedure based on a contention window, while a Type 2 LBT procedure may include a fixed sensing interval with an abbreviated time period (e.g., 25 μs or 16 μs) using gap constraints. For example, if the shared channel is idle for less than a predetermined gap period, then the sharing wireless node would attempt access using the Type 2 LBT procedure. Otherwise, if the shared channel is idle for longer than the predetermined gap period, the sharing wireless node would attempt access using the Type 1 LBT procedure in order to avoid collision with other radio access technologies attempting access to the shared channel.

NRU operations below 6 GHz may also be configured for frame-based LBT procedures initiated by base station having a fixed frame structure. Frame-based LBT procedures may also be used with COT sharing operations between a base station, such as base station 105, and UEs, such as UE 115, as indicated above. Frame-based LBT procedures may be intended for environments that have longer-term absence of other radio access technologies guaranteed by regulation or policy.

NRU operations at the 60 GHz band, with different communication parameters, such as subcarrier spacing (SCS), slot size, and the like, offer more options for LBT procedures. For example, wireless nodes may perform no LBT procedure, energy detection-based LBT procedures, receiver-assisted LBT procedures, directional LBT procedures, LBT procedures for COTs with multi-beams, and the like. At the 60 GHz band, there are generally no gap constraints within a COT, unlike NRU operations at sub7 GHz bands. Further, the standard baseline procedure include an extended clear channel assessment (eCCA), in which the LBT procedure includes a random count-down with 0-3 sensing slots.

To amplify the received signal, a repeater or relay node typically transmits with non-negligible power (e.g., similar to a typical UE). When operating in unlicensed band, it is expected that repeater transmission may also be subject to LBT operation, as in current transmission-reception point (TRP) or UE transmission. In addition, the base station and UEs associated with the repeater or relay node may also perform LBT procedures for downlink or uplink transmissions. When such transmissions are gated off due to an unsuccessful LBT procedure, the repeater or relay node would simply amplify the noise or interference of radio frequency (RF) signals detected on its antenna array. It may be beneficial to reduce such scenarios whenever possible. According to the various aspects described herein providing network controlled repeater operation at NRU bands according to one or more aspects, repeater operations including LBT procedures in the unlicensed spectrum may achieve a desired end-to-end performance during base station/UE communications, while minimizing or avoiding amplification of the noise or interference when the base station or UE's transmissions are gated off due to LBT failure.

Figure 4A:
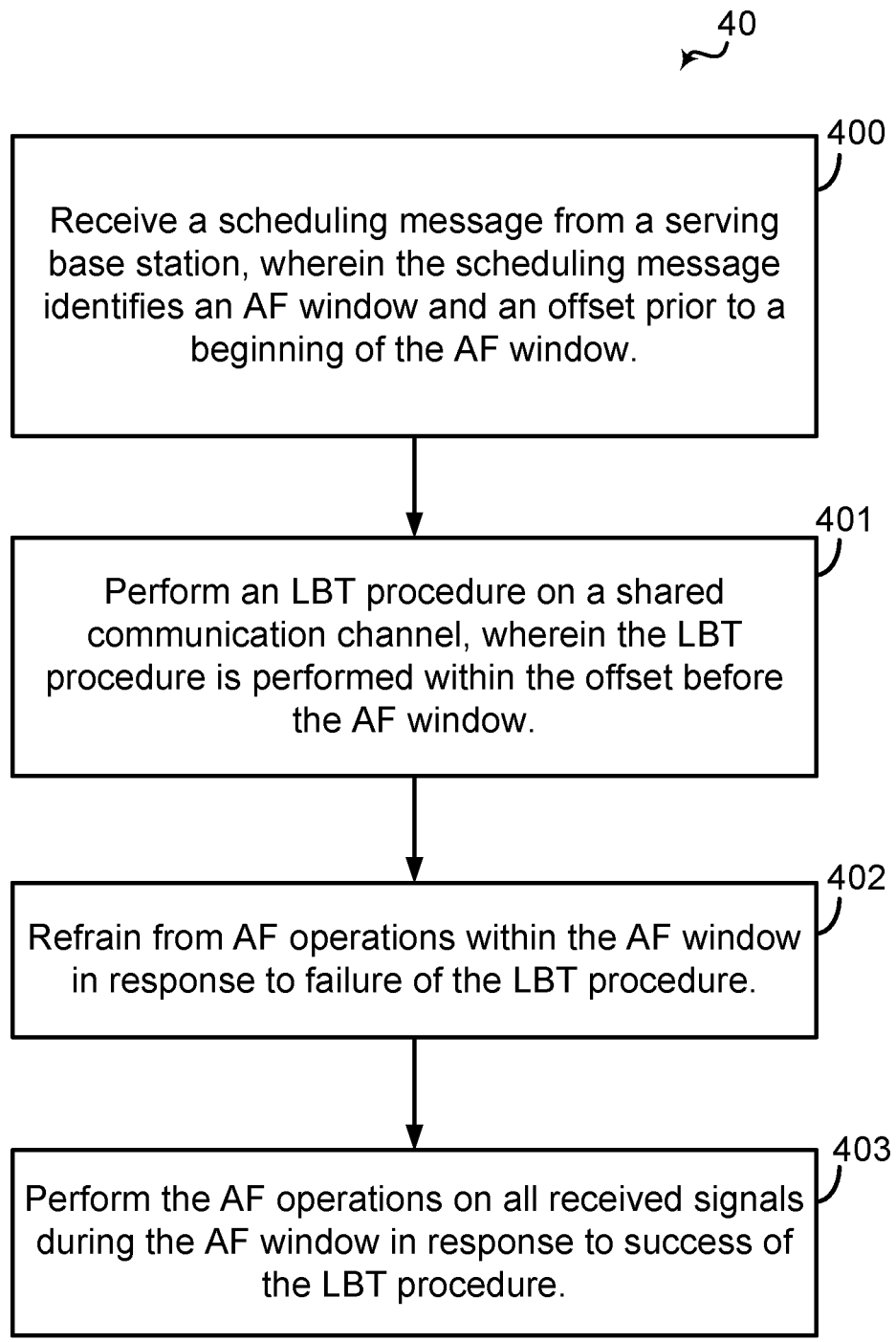
FIGS. 4A-4C are flow diagrams illustrating example processes that support network controlled repeater operation at NRU bands according to one or more aspects.

FIG. 4A is a flow diagram illustrating an example process 40 that supports network controlled repeater operation at NRU bands according to one or more aspects. Operations of process 40 may be performed by a relay node, such as relay node 300 described above with reference to FIG. 3, or relay node 300, as described with reference to FIG. 12. For example, example operations (also referred to as "blocks") of process 40 may enable relay node 300 to provide network controlled repeater operation at NRU bands according to one or more aspects.

Figure 11:
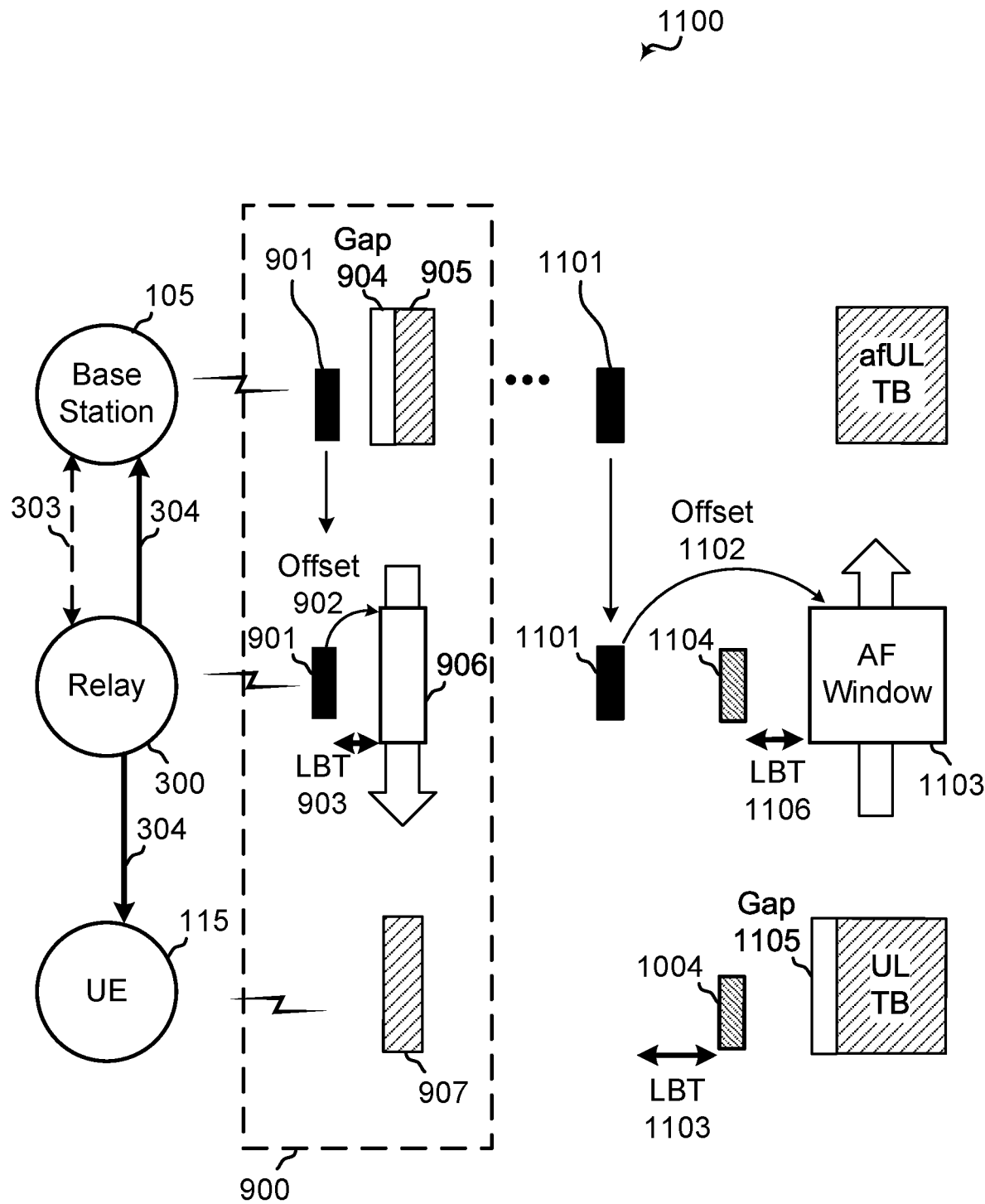
FIG. 11 is a block diagram illustrating a relay node within an NRU network providing AF operations on communications between a base station and UE that supports network controlled repeater operation at NRU bands according to one or more aspects.
Figure 12:
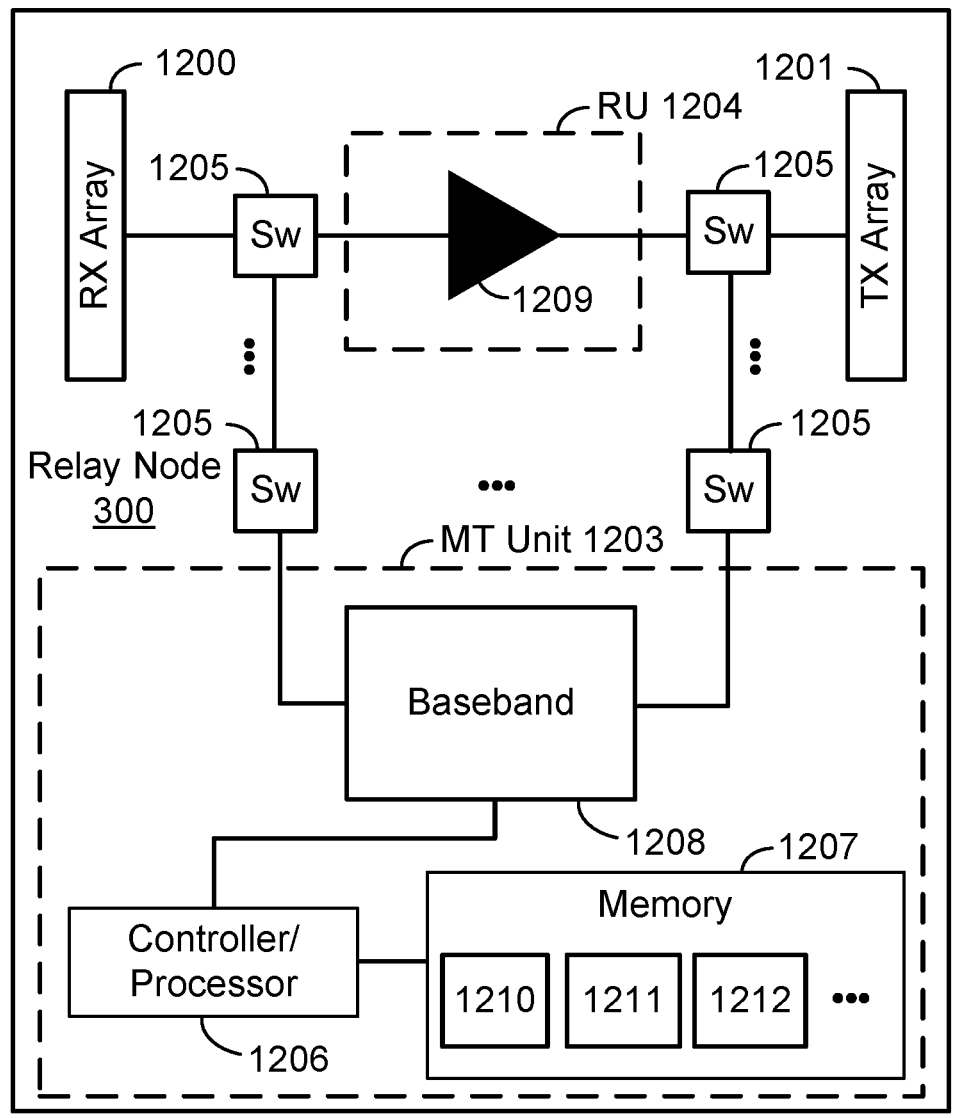
FIG. 12 is a block diagram of an example relay node that supports network controlled repeater operation at NRU bands according to one or more aspects.

As shown in FIG. 12, relay node 300 includes receiver antenna array 1200 and transmitter antenna array 1201 to receive and transmit signals. The RU 1204 may include at least an amplifier 1209 to amplify and forward the received signals for transmission on transmitter antenna array 1201. The MT unit 1203 includes baseband processing unit 1208 under control of controller/processor 1206 and the logic stored in memory 1207. The operations of relay node 300 are controlled by controller/processor 1206, which activates and deactivates selected ones of switches 1205 to enable RU operations via RU 1204 and MT operations via MT unit 1203. Memory 1207 may include AF operations logic 1210, AF window schedule 1211, LBT logic 1212, and the like. The steps and instructions of AF operations logic 1210, when executed by controller/processor 1206, provides the network controlled repeater functionality for relay node 300. AF window schedule 1211 stores either the fixed location of the AF window, as set by a serving base station, or in a floating location based on a separate trigger signal. LBT logic 1212, when executed by controller/processor 1206 provides LBT functionality for relay node 300. This functionality may include Type 1 or Type 2 LBT procedures according to a particular scenario or communication environment. Relay node 300 may receive signals from or transmit signals to one or more network entities, such as base station 105 or UE 115 of FIGS. 1-3 and 5-11.

At block 400, the relay node receives a scheduling message from a serving base station, wherein the scheduling message identifies an AF window and an offset prior to a beginning of the AF window. A relay node, such as relay node 300, executes, under control of controller/processor 1206, AF operations logic 1210. The execution of the code, steps, and instructions of AF operations logic 1210 enables the functional of network controlled repeaters or relay nodes according to the various aspects of the present disclosure. Such functionality enabled by execution is referred to herein as the "execution environment" of AF operations logic 1210. Within the execution environment of AF operations logic 1210, relay node 300 receives a scheduling message via receiver array 1200 and processed via baseband processing unit 1208, under control of controller/processor 1206. The information from the scheduling message includes a scheduling of an AF window. Relay node 300 receives this scheduling and stores it at AF window schedule 1211 in memory 1207. The scheduling of an AF window may provide either a fixed location for the AF window or a floating location relative to a separate trigger signal. The scheduling message further includes an offset, with which the AF window is defined. Relay node 300 stores the offset also at AF window schedule 1211 in memory 1207.

At block 401, the relay node performs an LBT procedure on a shared communication channel, wherein the LBT procedure is performed within the offset before the AF window. In preparation for conducting AF operations, within the execution environment of AF operations logic 1210, relay node 300, under control of controller/processor 1206, executes LBT logic 1212, in memory 1207. The execution environment of LBT logic 1212 provides the functionality to relay node 300 to perform an LBT procedure on the shared communication channel or bandwidth.

At block 402, the relay node refrains from AF operations within the AF window in response to failure of the LBT procedure. Within the execution environment of AF operations logic 1210, when relay node 300 detects failure of the LBT procedure, relay node 300 refrains from conducting AF operations at the AF window.

At block 403, the relay node performs the AF operations on all received signals during the AF window in response to success of the LBT procedure. Within the execution environment of AF operations logic 1210, when relay node 300 detects success of the LBT procedure, relay node 300 activates RU 1204 and conducts AF operations on received signals and forwards the amplified signals, amplified at amplifier 1209, via transmitter array 1201.

Figure 4B:
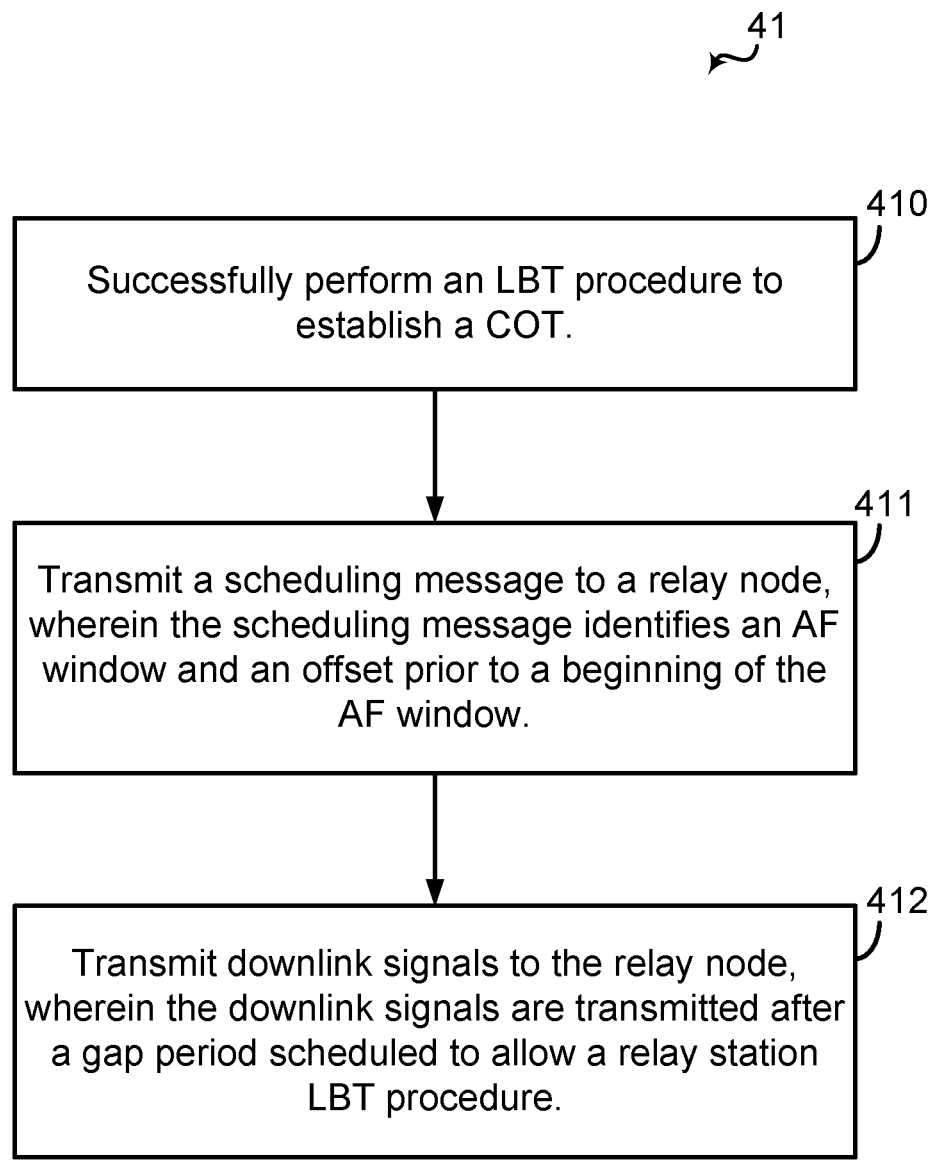
Figure 14:
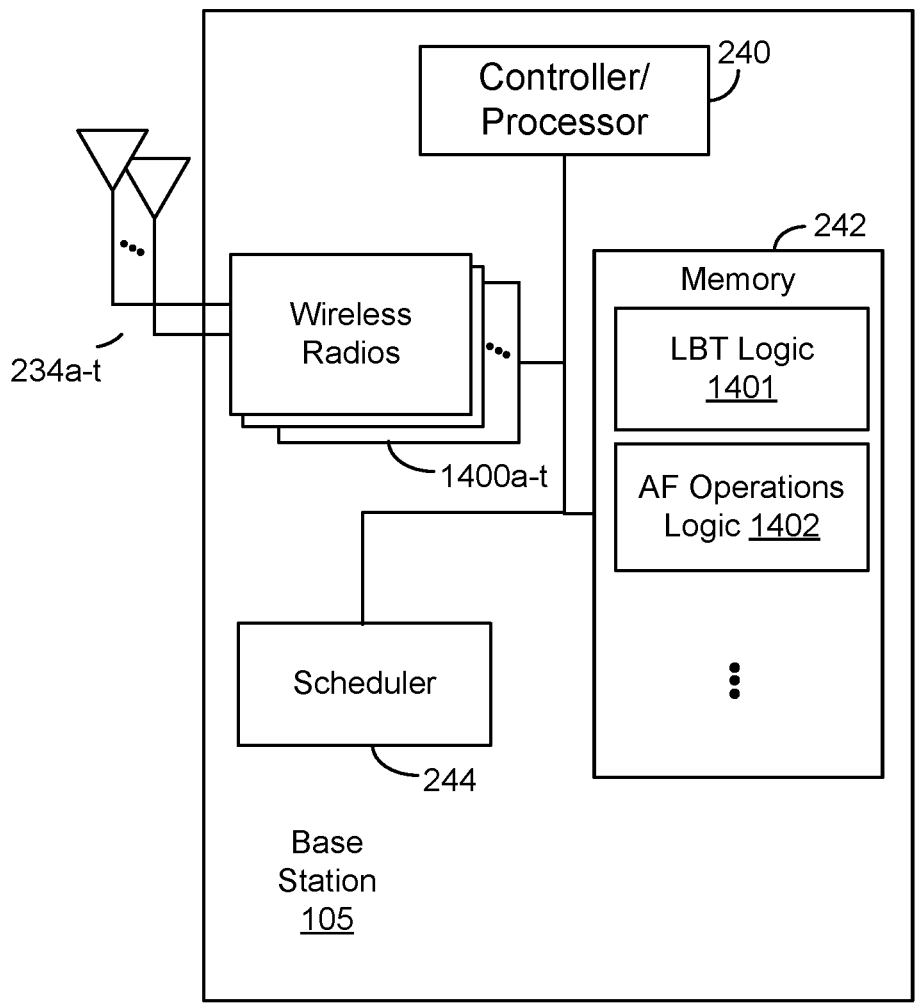
FIG. 14 is a block diagram of an example base station that supports network controlled repeater operation at NRU bands according to one or more aspects.

FIG. 4B is a flow diagram illustrating an example process 41 that supports network controlled repeater operation at NRU bands according to one or more aspects. Operations of process 41 may be performed by a base station, such as base station 105 described above with reference to FIGS. 1-2, or base station 105, as described with reference to FIG. 14. For example, example operations (also referred to as "blocks") of process 41 may enable base station 105 to implement network controlled repeater operation at NRU bands according to one or more aspects.

As shown, memory 242 may include LBT logic 1401, AF operations logic 1402, and the like. LBT logic 1401, when executed by controller/processor 240 provides LBT functionality for base station 105. This functionality may include Type 1 or Type 2 LBT procedures according to a particular scenario or communication environment. The steps and instructions of AF operations logic 1402, when executed by controller/processor 240, provides the functionality for base station 105 to operate in an environment that uses a repeater or relay node. Base station 105 may receive signals from or transmit signals to one or more network entities, such as base station 105 or UE 115, of FIGS. 1-3 and 5-11, via a relay node, such as relay node 300 of FIGS. 3, 5-12.

At block 410, a base station successfully performs an LBT procedure to establish a COT. In preparation for transmissions, a base station, such as base station 105, under control of controller/processor 240, executes LBT logic 1401, in memory 242. The execution environment of LBT logic 1401 provides the functionality to base station 105 to perform an LBT procedure on the shared communication channel or bandwidth. Upon detecting success of the LBT procedure, base station 105 secures a COT, during which it may transmit for a predetermined duration without performing another LBT procedure. Other entities in association with base station 105, may also transmit within the COT by performing an abbreviated LBT procedure, such as a Type 2 LBT procedure.

At block 411, the base station transmits a scheduling message to a relay node, wherein the scheduling message identifies an AF window and an offset prior to a beginning of the AF window. A base station, such as base station 105, executes, under control of controller/processor 240, AF operations logic 1401 when operating in an environment that will use a repeater or relay node. Within the execution environment of AF operations logic 1210, base station 105, via scheduler 244, schedules an AF window for a relay node within its communication environment. To schedule the AF window, base station 105 will transmit a scheduling message that includes at least an offset that will define the AF window, either as a fixed location or at a floating location relative to a separate trigger signal. Base station 105, under control of controller/processor 240, transmits the scheduling message to the relay node via wireless radios 1400*a-t* and antennas 234*a-t*.

At block 412, the base station transmits downlink signals to the relay node, wherein the downlink signals are transmitted after a gap period scheduled to allow a relay station LBT procedure. As base station 105 prepare to transmit a downlink burst according to the schedule of the AF window, base station 105, within the execution environment of AF operations logic 1202, provides a gap prior to beginning the downlink burst. This gap is provided in order to allow the relay node to conduct an LBT procedure prior to conducting the AF operations.

Figure 4C:
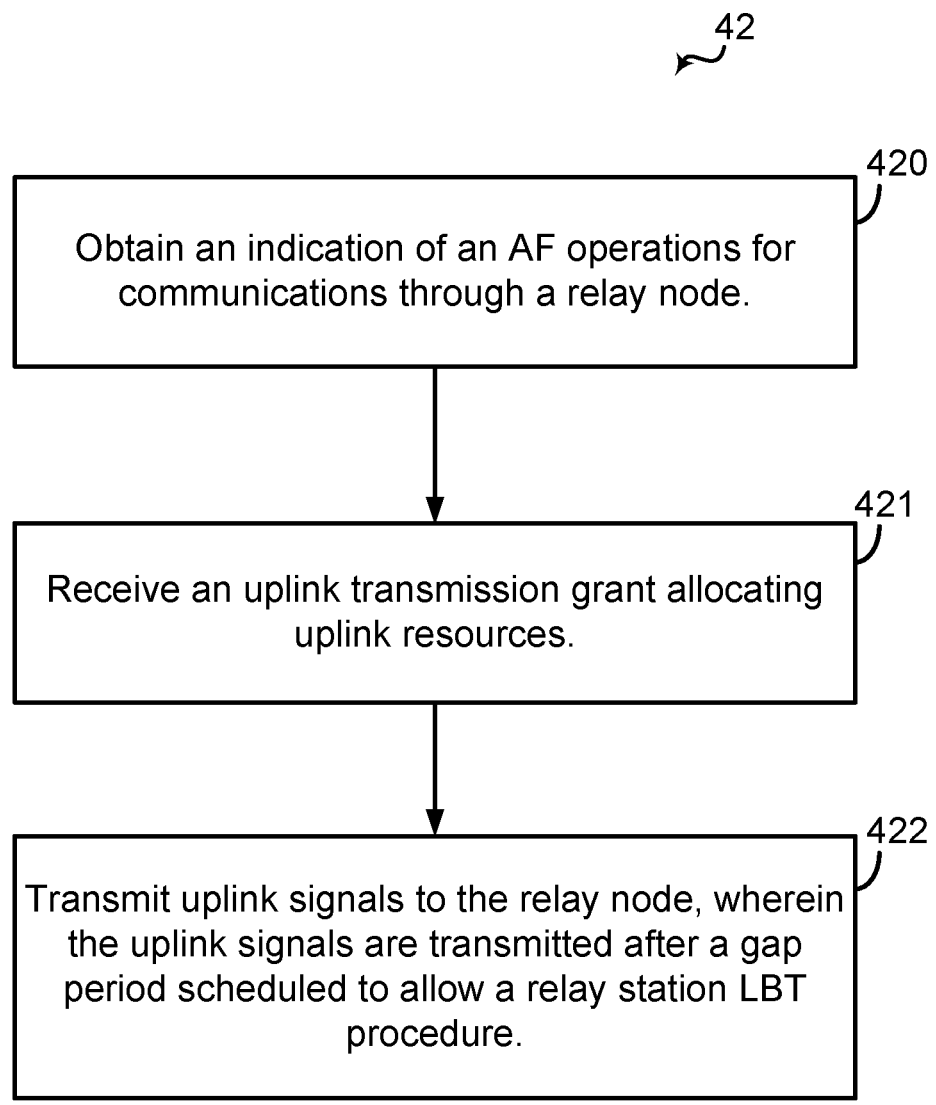

FIG. 4C is a flow diagram illustrating an example process 42 that supports network controlled repeater operation at NRU bands according to one or more aspects. Operations of process 42 may be performed by a UE, such as UE 115 described above with reference to FIGS. 1-2, or UE 115, as described with reference to FIG. 12. For example, example operations (also referred to as "blocks") of process 40 may enable relay node 300 to provide network controlled repeater operation at NRU bands according to one or more aspects.

As shown, memory 282 may include AF operations logic 1301, LBT logic 1302, and the like. The steps and instructions of AF operations logic 1301, when executed by controller/processor 280, provides the functionality for UE 115 to operate in an environment that uses a repeater or relay node. LBT logic 1302, when executed by controller/processor 280 provides LBT functionality for UE 115. This functionality may include Type 1 or Type 2 LBT procedures according to a particular scenario or communication environment. UE 115 may receive signals from or transmit signals to one or more network entities, such as base station 105 or UE 115, of FIGS. 1-3 and 5-11, via a relay node, such as relay node 300 of FIGS. 3, 5-12.

At block 420, a UE obtains an indication of AF operations for communications through a relay node. A UE, such as UE 115, may receive an indication, through a control signal from a serving base station, a system information broadcast, or the like, that the communication environment in which UE 115 is operating may include a repeater or relay node for AF operations. In response to the indication, UE 115, under control of controller/processor 280, executes AF operations logic 1301. The execution environment of AF operations logic 1301 provides additional functionality to UE 115 in order to operate in consideration of a network controlled repeater or relay node.

At block 421, the UE receives an uplink transmission grant allocating uplink resources. UE 115 may receive an uplink grant via antennas 252a-r and wireless radios 1300a-r from a serving base station to schedule an uplink transmissions. This uplink transmission may include a control signal transmission, a data transmission, or combination of both.

At block 422, the UE transmits uplink signals to the relay node, wherein the uplink signals are transmitted after a gap period scheduled to allow a relay station LBT procedure. Within the execution environment of AF operations logic 1301, prior to transmitting the uplink communication, UE 115 provides a gap to allow the repeater or relay node to perform an LBT procedure. UE 115 may then transmit the uplink communications after the gap via wireless radios 1300a-r and antennas 252a-r.

According to the various aspects providing network controlled repeater operation at NRU bands, the repeater or relay node performs an LBT procedure before AF operations based on a received repeater control signaling from a base station that schedules an AF window. The LBT type performed by the repeater or relay node may be indicated by the repeater control signaling, e.g., Type 1 or Type 2 LBT or defined by the standards, e.g., a specific LBT type performed by repeater or relay node. In a first optional aspect an AF window with a fixed location indicated by the repeater control signaling. For example, the repeater control signaling may include an indication to schedule an offset in slots/symbols from the repeater control signaling to the scheduled AF window.

In a second optional aspect, a two-stage signaling approach may be used to define an AF window with a floating location. In the two-stage approach, the location of the AF window may be determined later by a triggering signal. The triggering signal and/or the offset, between the triggering signal and the AF window, can be indicated by the repeater control signaling, or specified by standards. For example, the triggering signal can be a DCI type message with COT information, or some specifically-designed preamble or reference signal transmitted by a base station or UE to the repeater or relay node. A repeater or relay node would be able to recognize the trigger signal using the specifically-designed preamble or reference signal without decoding the signal. In contrast, a DCI-based trigger signal would first be decoded by the repeater or relay node prior to recognizing the signal.

In a third optional aspect, the repeater control signaling may indicate an AF window with a fixed location, but the AF operation may be conditioned at least on the repeater or relay node receiving a subsequent triggering signal. As above, the triggering signal can be indicated by the repeater control signaling or specified by standards, and may include either a DCI-based signal or something that is specifically designed, which would allow less complexity or processing power within the repeater or relay node in which to recognize the trigger. If the repeater or relay node has not received the triggering signal within the offset, before the start of scheduled AF window, the repeater or relay node would not conduct the AF operations over scheduled AF window. Otherwise, the repeater or relay node will perform an LBT procedure according to the repeater control signaling, and conduct AF operations in response to success of the LBT procedure.

In operation of the various aspects, the repeater control signaling and scheduled AF window may be located within the same COT, whether initiated by the base station or an associated UE. For downlink transmissions within a base station-initiated COT, the repeater or relay node would perform an LBT procedure for the scheduled AF operation, wherein the base station is already within its own COT and would not perform additional LBT procedures in order to transmit within the scheduled AF window of the repeater or relay node. The example aspect using a fixed AF window may be more suitable for the use case in which the repeater control signaling and the AF window are within the same COT.

The second and third optional aspects, where floating and fixed AF windows can be defined relative to a separate trigger signal may be more suitable for the two-stage signaling approach, because the repeater's or relay node's AF operation may be located within the next COT to avoid amplifying noise.

Repeater control signaling may further indicate a list of candidate starting AF occasions within the scheduled AF window, whether a fixed or floating window, the repeater or relay node may continue performing LBT procedures over the candidate occasions until one of them succeeds, and then perform AF operations. Consecutive PDCCH/PDSCHs, or consecutive-PUSCHs by a UE, which may be transparent to the repeater or relay node and scheduled by the base station via the repeater or relay node within an AF window, and the starting symbol of each transmission occasion within an AF window can be indicated by the repeating control signaling as a candidate occasion for the repeater or relay node initiating AF operation. The repeater or relay node will conduct AF operations after it has successfully passed the LBT procedure at a candidate occasion. Otherwise, the repeater or relay node will perform an LBT procedure at the next candidate occasion. If a list of candidate starting AF occasions are not specified in the repeating control signaling, the repeater ore relay node may perform a single LBT procedure before the scheduled AF window. The repeater or relay node's conducting of AF operations over the entirety of the AF window will be determined by the success or failure of the single LBT procedure.

In the example aspects, it remains the responsibility of the base station or UE to maintain its COT, and leave gaps before transmissions for the repeater or relay node to perform its LBT procedure. The repeater or relay node may also send LBT status reports to the base station, such as to trigger a new scheduling in case of LBT failure. It should be noted that an LBT failure by the repeater or relay node may cause the UE to miss the base station's grant and, thus, would not trigger acknowledgement feedback that would prompt retransmission. Therefore, the LBT status report that indicates at least the LBT failures from the repeater or relay node, can allow the base station to make a new schedule for the missed transmission. The base station may trigger periodic/aperiodic virtual LBT status reports from the repeater or relay node before scheduling the repeater or relay node for AF operations for a more efficient scheduling decision. It should be noted that the repeater control signaling from the base station can be carried by existing downlink signaling, such as, for example, a PDCCH DCI format, a media access control—control element (MAC CE), or by radio resource control (RRC) signaling depending on the control interface design of the repeater or relay node.

As described with reference to FIGS. 4A-4C, the present disclosure provides techniques for network controlled repeater operation at NRU bands. The example aspects allow for repeater or relay node-enabled communications between base stations and UEs to minimize or avoid the repeater or relay node amplifying noise or interference that would be present when the transmissions of the base station or UE are gated off or prevented due to LBT failure.

Figure 5:
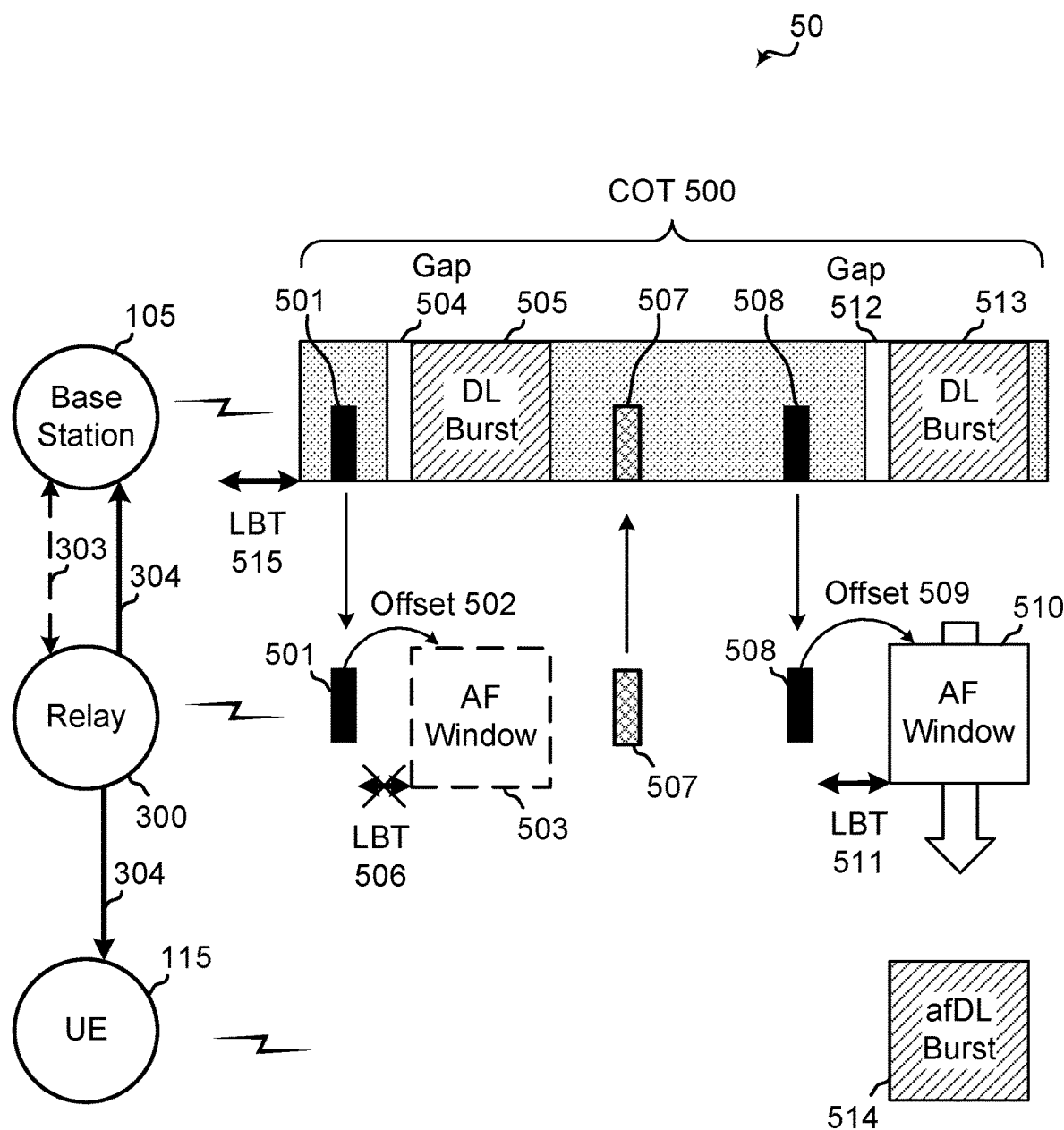
FIG. 5 is a block diagram illustrating a relay node within an NRU network providing AF operations on communications between a base station and UE that supports network controlled repeater operation at NRU bands according to one or more aspects.

FIG. 5 is a block diagram illustrating a relay node 300 within NRU network 50 providing AF operations on communications between base station 105 and UE 115 that supports network controlled repeater operation at NRU bands according to one or more aspects. Relay node 300 is a network-controlled repeater that is controlled via control path 303 by base station 105. Uplink and downlink communications between base station 105 and UE 115 may be repeated by relay node 300, via data path 304, according to the control information obtained via control path 303. Base station 105 successfully performs LBT procedure 515 to secure COT 500 over a shared communication channel. According to the illustrated aspect, base station 105 signals a repeater control message 501 to relay node 300, which schedules AF windows 503 and 510 within COT 500. Repeater control message 501 also includes a fixed offset, offset 502, relative to repeater control message 501 for defining AF windows 503 and 510.

In operations according to the illustrated aspect, base station 105 includes gap 504 before downlink burst 505 in order to allow relay node 300 to perform LBT procedure 506. As illustrated, relay node 300 detects failure of LBT procedure 506 and, thus, does not conduct any AF operations with AF window 503. Relay node 300 may then transmit LBT status report 507 to base station 105 that identifies the failure of LBT procedure 506. LBT status report 507 may always be sent by relay node 300 and include indications of both successful and unsuccessful LBT procedures. Additional aspects may provide that LBT status report 507 is sent on an LBT failure and indicate to base station 105 the instances where relay node 300 did not perform AF operations.

Upon receipt of LBT status report 507, base station 105 schedules retransmission of the information from downlink burst 505. Base station 105 signals repeater control message 508, which schedules AF window 510 with offset 509. Prior to retransmission of the information in downlink burst 513, base station 105 again provides gap 512 in order to allow relay node 300 to conduct LBT procedure 511. As illustrated, LBT procedure 511 is successful, thus, triggering relay node 300 to perform AF operations during AF window 510. With AF operations, UE 115 receives the transmitted downlink data at afDL burst 514.

It should be noted that downlink bursts 505 and 513 may include both control and data transmissions (e.g., PDCCH and PDSCH), control transmissions only (e.g., PDCCH), data transmissions only (e.g., PDSCH), or other downlink signaling, such as synchronization signal block (SSB), channel state information-reference signal (CSI-RS), and the like. Such repeater operations according to the illustrated aspect may be used, for example, for both control signaling and scheduled AF window within a base station-initiated COT, such as COT 500.

Figure 6:
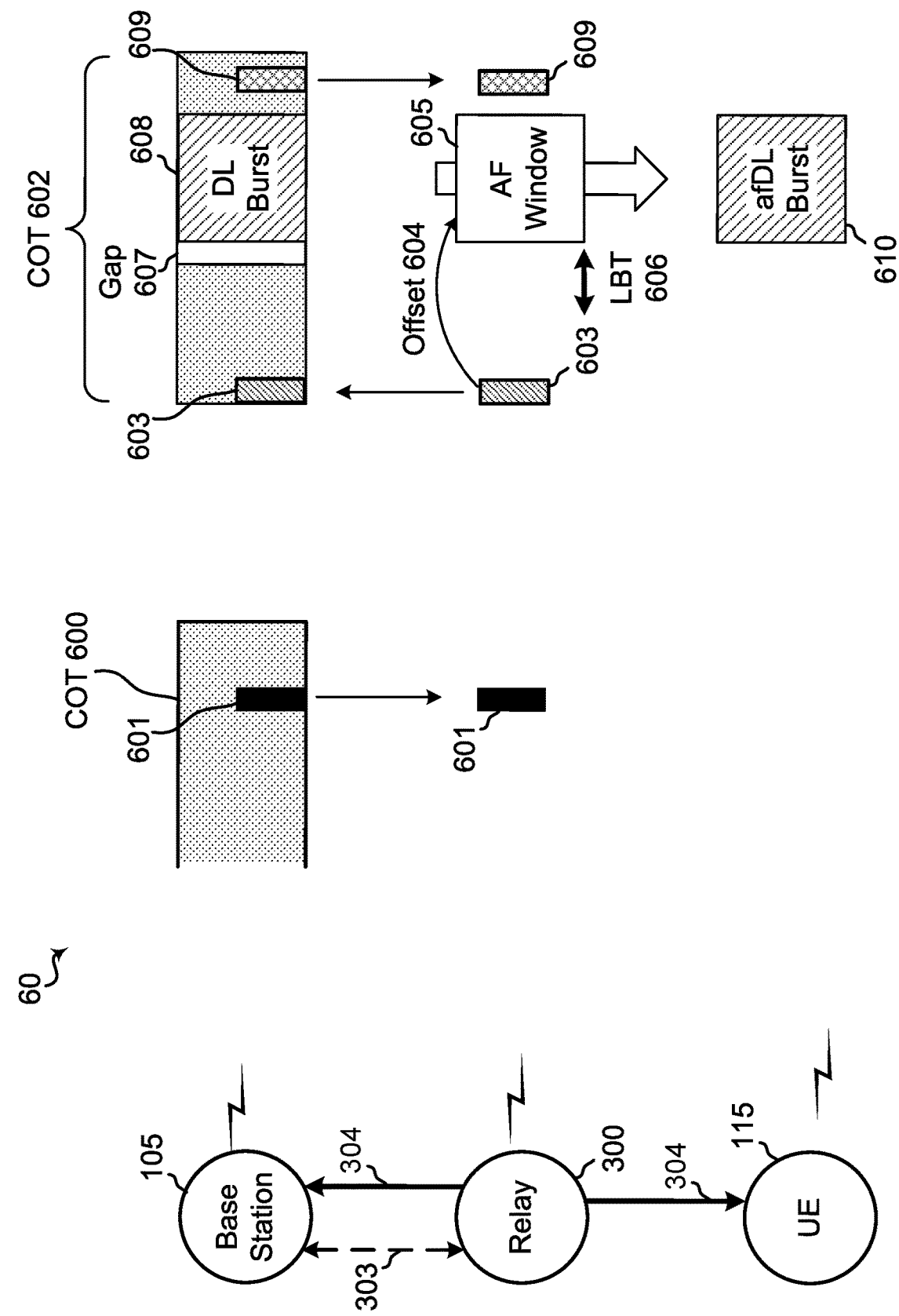
FIG. 6 is a block diagram illustrating a relay node within an NRU network providing AF operations on communications between a base station and UE that supports network controlled repeater operation at NRU bands according to one or more aspects.

FIG. 6 is a block diagram illustrating a relay node 300 within NRU network 60 providing AF operations on communications between base station 105 and UE 115 that supports network controlled repeater operation at NRU bands according to one or more aspects. As noted above, relay node 300 is controlled via control path 303 by base station 105 with uplink and downlink communications between base station 105 and UE 115 repeated by relay node 300, via data path 304. Within COT 600, base station 105 signals repeater control message 601 to relay node 300 which includes indication of an offset 604 relative to a trigger signal, such as trigger signal 603, where AF window 605 may be defined. By including offset 604 relative to a future trigger signal, the location of AF window 605 will float dependent on a trigger signal, such as trigger signal 603, being sent and received by relay node 300.

Upon establishing a subsequent COT, COT 602, base station 105 transmits triggering signal 603 to relay node 300. Using offset 604, as configured via repeater control message 601, relay node 300 defines AF window 605. Prior to transmitting downlink burst 608, base station 105 provides gap 607 to allow relay node 300 to perform LBT procedure 606. When relay node 300 detects success of LBT procedure 606, it may then conduct AF operations forwarding the signals from downlink burst 608 to UE 115, which receives afDL burst 610. In the illustrated aspect, relay node 300 may then send LBT status report 609 which indicates a successful LBT procedure and AF operation for downlink burst 608.

It should be noted that trigger signal 603 can be implemented using various different type of signals, such as a DCI format 2_0 with COT information or a preamble/reference signal indicating where the COT begins. Such an illustrated aspect may be used for multi-COT scenarios, where the control signaling is sent at a previous COT (e.g., COT 600) before an AF window, such as AF window 605, located in a later COT (e.g., COT 602) and defined based on offset 604 relative to a trigger signal, such as trigger signal 603.

Figure 7A:
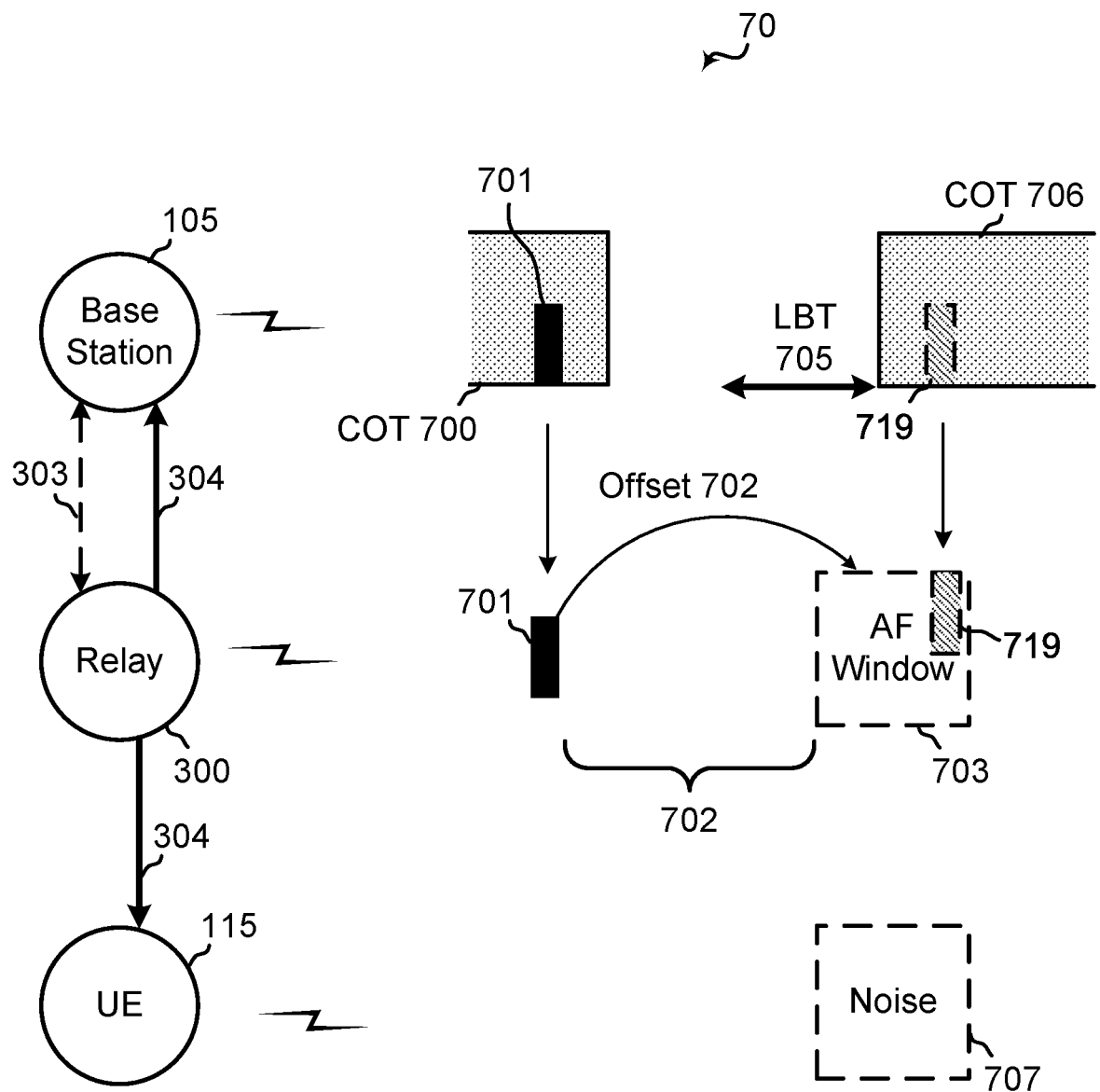
FIGS. 7A-7B are block diagrams illustrating a relay node within NRU networks providing AF operations on communications between a base station and UE that supports network controlled repeater operation at NRU bands according to one or more aspects.
Figure 7B:
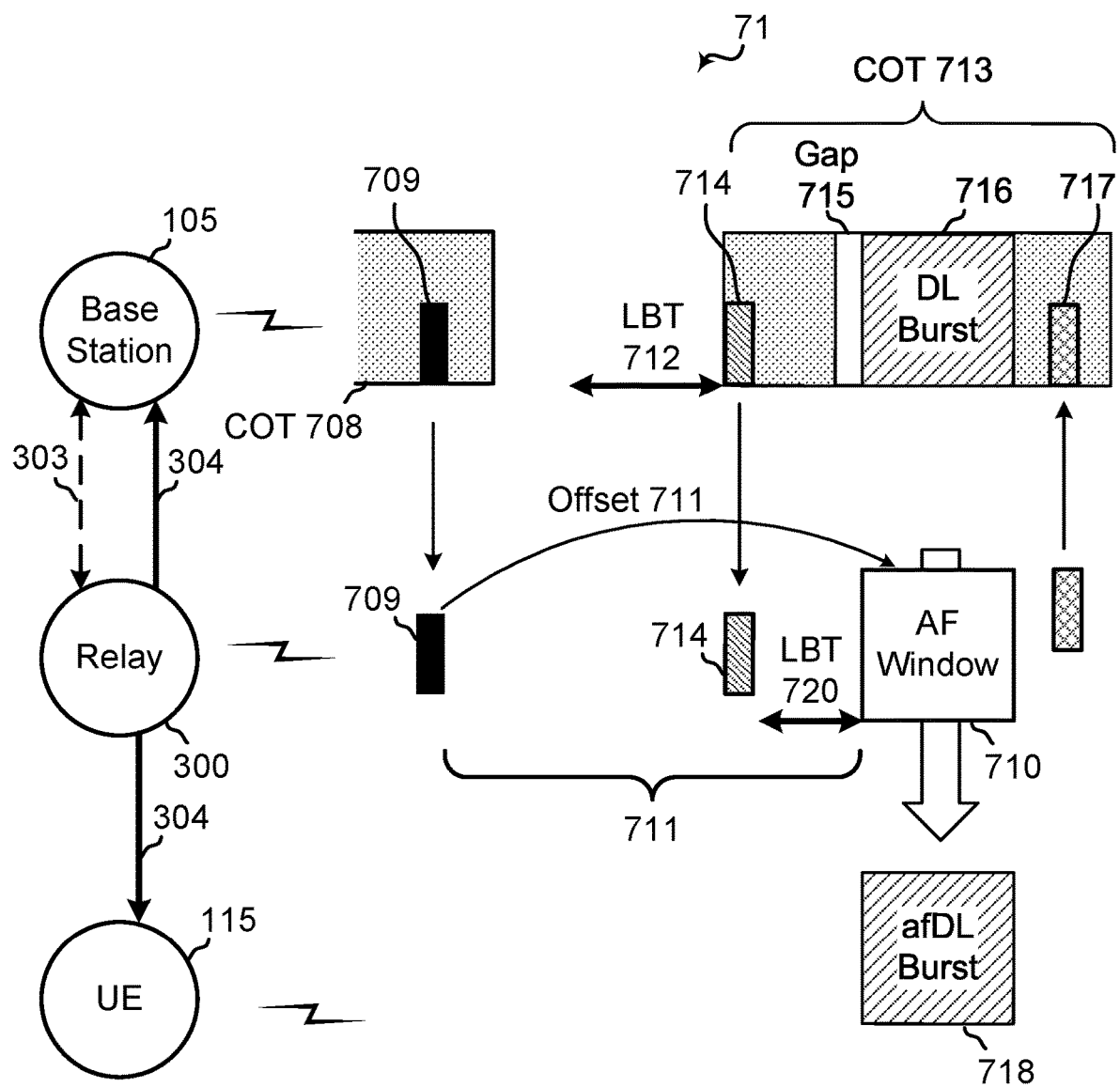

FIGS. 7A and 7B are block diagrams illustrating a relay node 300 within NRU networks 70 and 71 providing AF operations on communications between base station 105 and UE 115 that supports network controlled repeater operation at NRU bands according to one or more aspects. As noted above, relay node 300 is controlled via control path 303 by base station 105 with uplink and downlink communications between base station 105 and UE 115 repeated by relay node 300, via data path 304. Within COT 700/708, base station 105 signals repeater control message 701/709 to relay node 300 which includes indication of an offset 702/711 relative to repeater control message 701/709, which schedules an AF window, such as AF window 703 (FIG. 7A) and AF window 710 (FIG. 7B). Relay node 300 will monitor for a trigger signal within offset 702/711 before performing the AF operation in AF window 703/710. Relay node 300 will either know, such as through standard operation, or be indicated within repeater control message 701/709, that relay node 300 will not perform the AF operation within AF window 703/710 unless a trigger signal is received within offset 702/711.

In the example operation illustrated in FIG. 7A, base station 105, within COT 700, sends repeater control message 701. After receiving repeater control message 701, relay node 300 monitors for a trigger signal within offset 702. As illustrated, relay node 300 does not detect a trigger signal within offset 702. In response, relay node 300 refrains from conducting the AF operations within AF window 703. In an alternative example, base station 105 secures a subsequent COT, COT 706, after successfully performing LBT procedure 705 and transmits a trigger signal 719 which relay node 300 receives during AF window 703. However, because relay node 300 did not receive trigger signal 719 within offset 702, relay node 300 would still refrain from conducting any AF operations within AF window 703. Accordingly, without AF operations within AF window 703, UE 115 would receive only noise 707.

In the example operation illustrated in FIG. 7B, base station 105, within COT 708, sends repeater control message 709. After receiving repeater control message 709, relay node 300 monitors for a trigger signal within offset 714. Base station 105 secures a subsequent COT, COT 713, after successfully performing LBT procedure 712. Base station 105 sends trigger signal 714 within COT 713, which relay node 300 within offset 714. In response to receipt of trigger signal 714, relay node 300 successfully performs LBT procedure 720, within gap 715, provided by base station 105 before transmitting downlink burst 716. Relay node 300 then performs AF operations within AF window 710, which amplifies and forwards downlink burst 716 which are received at UE 115 as afDL burst 718. After AF window 710, relay node 300 may then transmit LBT status report 717 to base station 105 to indicate results of LBT procedure 720.

According to the example aspects illustrated in FIGS. 7A and 7B, repeater control message 701/709 schedules AF window 703/710 with a fixed offset, offset 702/711 conditioned on a triggering signal. Relay node 300 performs AF operations within AF window 703/710 if it receives the triggering signal within offset 702/711 (no trigger signal in FIG. 7A, trigger signal 714 in FIG. 7B) and passing LBT (LBT procedure 712 in FIG. 7B). It should be noted that trigger signal 714 can be implemented using various different types of downlink signals, such as a DCI format 2_0 with COT information or a preamble/reference signal indicating the start of a COT. Such example aspects may be used when the repeater control messages may be received in one COT where the trigger signal and downlink transmission is conducted in a subsequent COT.

Figure 8:
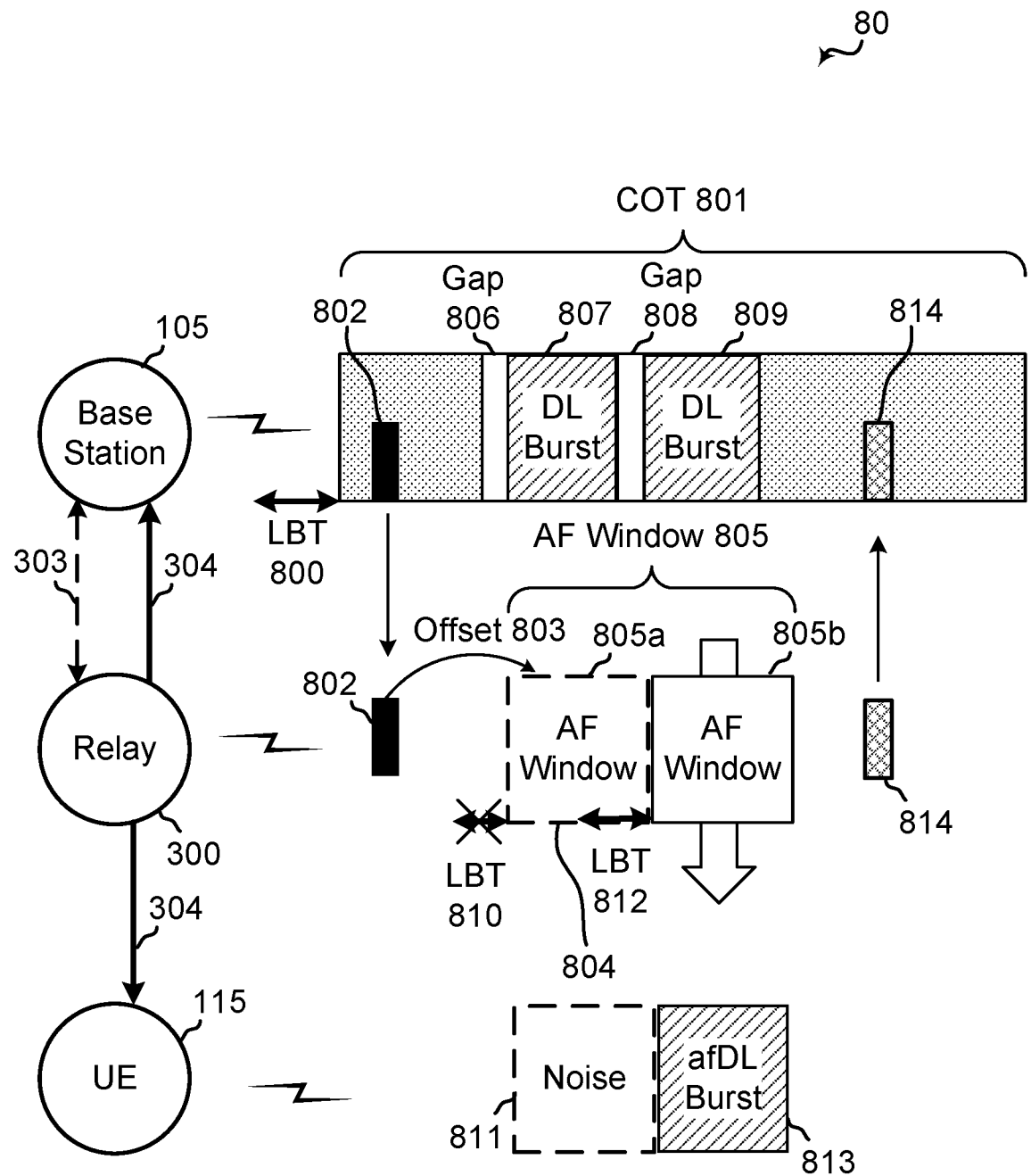
FIG. 8 is a block diagram illustrating a relay node within an NRU network providing AF operations on communications between a base station and UE that supports network controlled repeater operation at NRU bands according to one or more aspects.

FIG. 8 is a block diagram illustrating a relay node 300 within NRU network 80 providing AF operations on communications between base station 105 and UE 115 that supports network controlled repeater operation at NRU bands according to one or more aspects. As noted above, relay node 300 is controlled via control path 303 by base station 105 with uplink and downlink communications between base station 105 and UE 115 repeated by relay node 300, via data path 304. Base station 105 successfully performs LBT procedure 800 to establish COT 801. Within COT 801, base station 105 signals repeater control message 802 to relay node 300 which includes indication of an offset 803 relative repeater control message 802. Offset 803 schedules the AF window 805. Repeater control message 802 also includes an optional list of candidate occasions within AF window 805 (e.g., AF windows 805a-805b).

Base station 105 provides gap 806 before transmitting downlink burst 807, during which relay node 300 performs LBT procedure 810. Upon detecting failure of LBT procedure 810, relay node 300 refrains from AF operations during the occasion of AF window 805a. Accordingly, UE 115 would receive noise 811 without relay node 300 performing the AF operations. With the failure of LBT procedure 810, relay node 300 performs LBT procedure 812 at the next occasion of AF window 805b. Relay node 300 performs LBT procedure 812 within gap 808, which is provided by base station 105 prior to transmitting downlink burst 809. Upon detecting success of LBT procedure 812, relay node 300 performs AF operations within the occasion of AF window 805b to forward downlink burst 809 to be received by UE 115 as afDL burst 813. Relay node 300 may then transmit LBT status report 814 to base station 105 which identifies at least the failed LBT procedure 810.

According to the example aspect illustrated in FIG. 8, repeater control message 802 may indicate an optional list of candidate occasions (e.g., AF windows 805a-805b) within AF window 805 for relay node 300 to conduct or perform LBT procedures. The candidate occasions indicate the occasions that relay node 300 can start with AF operation after passing an LBT procedure. For example, a candidate occasion may correspond to the starting symbol of a (PDCCH+ PDSCH), a PDSCH, a PUSCH transmission out of multiple scheduled transmissions, and the like. Relay node 300 may keep attempting LBT procedures on the candidate occasions until success, and perform AF operations after the successful LBT procedure within AF window 805. AF operations may be performed over the entire AF window 805 or the individual occasions depending on when an LBT procedure is successful.

Figure 9A:
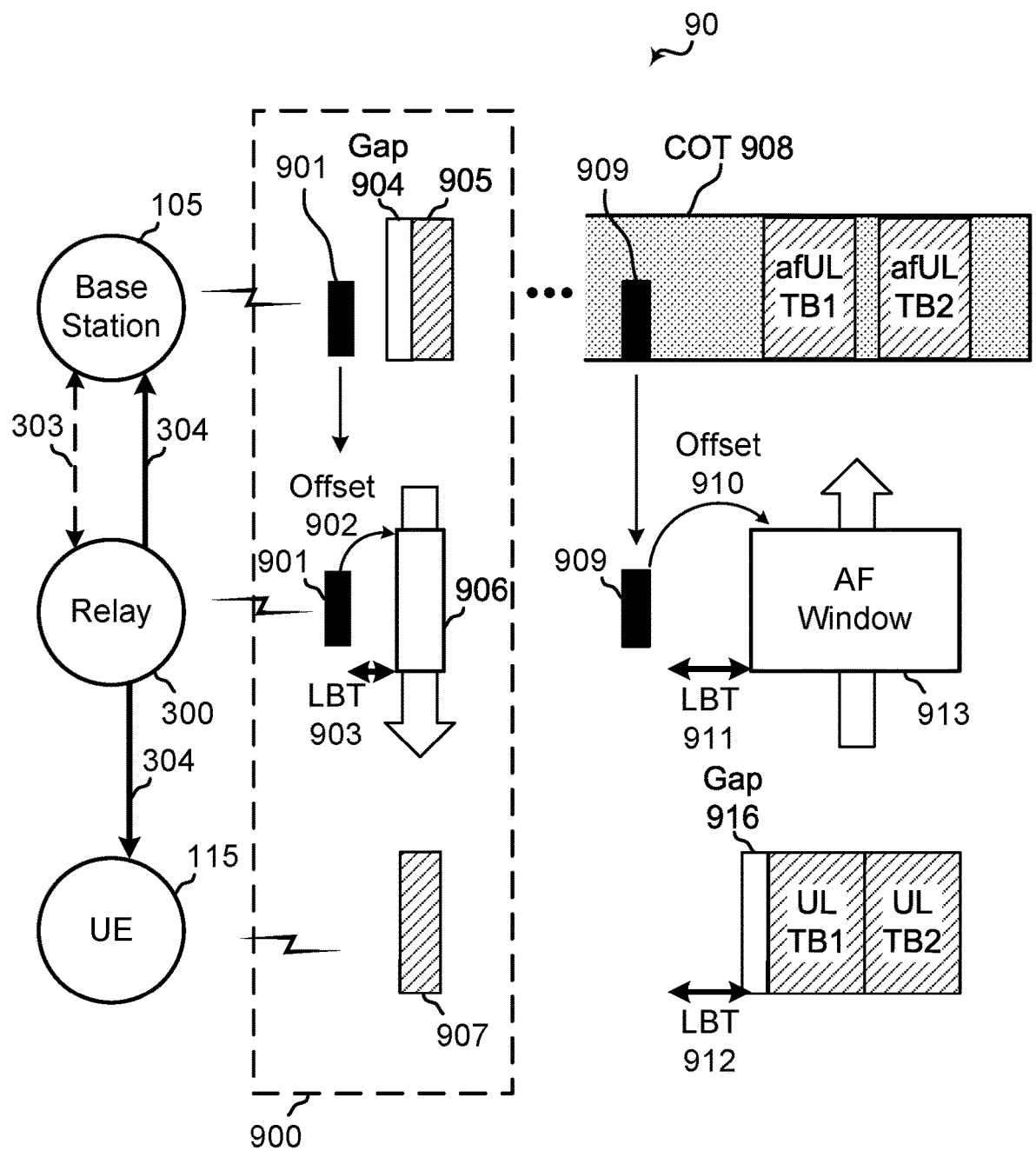
FIGS. 9A-9B are block diagrams illustrating a relay node within an NRU network providing AF operations on communications between a base station and UE that supports network controlled repeater operation at NRU bands according to one or more aspects.
Figure 9B:
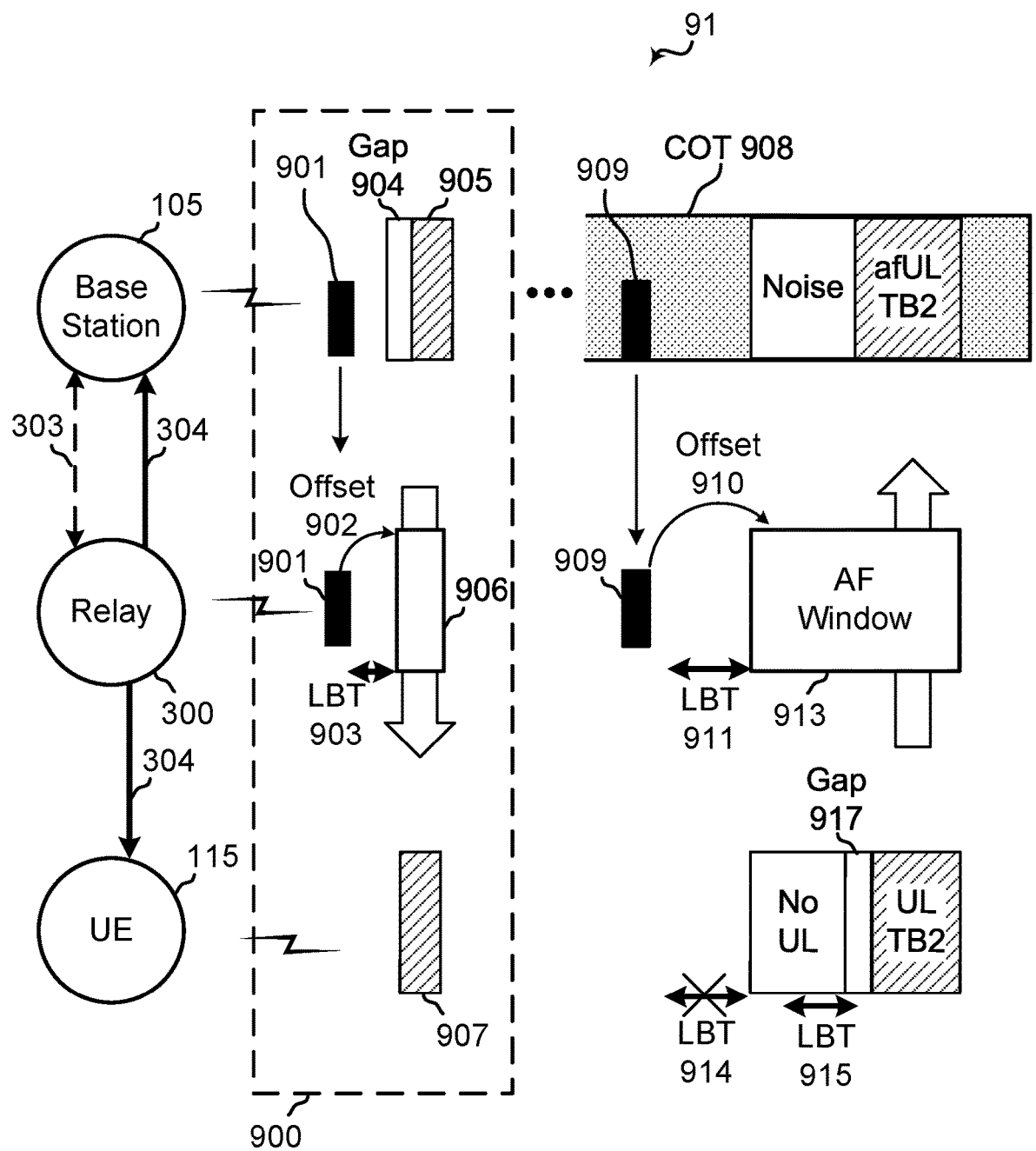

FIGS. 9A and 9B are block diagrams illustrating a relay node 300 within NRU networks 90 and 91 providing AF operations on communications between base station 105 and UE 115 that supports network controlled repeater operation at NRU bands according to one or more aspects. As noted above, relay node 300 is controlled via control path 303 by base station 105 with uplink and downlink communications between base station 105 and UE 115 repeated by relay node 300, via data path 304. The example aspects of FIGS. 9A and 9B illustrate repeater functionality with respect to uplink communications from UE 115. Uplink grant procedure 900 may be conducted within COT 908 or within a COT earlier than COT 908. Within uplink grant procedure 900, base station 105 signals repeater control message 901 to relay node 300 that includes offset 902 scheduling AF window 906. Base station 105 provides gap 904 prior to transmitting uplink grant signal 905. Relay node 300 successfully conducts LBT procedure 903 within gap 904, after which it performs AF operations within AF window 906 to forward uplink grant signal 905 which may be received as afUL grant 907. Uplink grant 907 schedules UE 115 for uplink transmissions at uplink transport block (TB)1 and uplink TB2. Within COT 908, base station 105 signals repeater control message 909 to relay node 300 which includes indication of an offset 910 relative to repeater control message 909, which schedules AF window 913. Relay node 300 successfully performs LBT procedure 911 which indicates that it will conduct AF operations within AF window 913.

In the example aspect illustrated in FIG. 9A, UE 115 successfully performs LBT procedure 912. After success of LBT procedure 912, UE 115 provides a gap 916 before transmitting uplink TB1 for relay node 300 to perform LBT procedure 911. UE 115 may then transmit uplink TB1 and uplink TB2. With relay node 300 successfully completing LBT procedure 911, uplink TB1 and uplink TB2 are forward by the AF operations of relay node 300 in AF window 913, which are received at base station 105 as afUL TB1 and afUL TB2.

In the example aspect illustrated in FIG. 9B, UE 115 detects failure of LBT procedure 914 and does not transmit uplink TB1. UE 115 successfully performs LBT procedure 915 before transmitting uplink TB2. With relay node 300 having passed LBT procedure 911, relay node 300 conducts AF operations within AF window 913, which results in base station 105 receiving noise, for the failure of LBT procedure 914 causing UE 115 to refrain from transmitting uplink TB1, and receives afUL TB2 forwarded from UE 115 transmission of uplink TB2.

In the example aspects illustrated in FIGS. 9A and 9B, COT 908, within which the scheduled AF window, AF window 913, is located, may be initiated by either base station 105 or by UE 115. As noted above, repeater control messages 901 and 909 may be transmitted within the same or different COTs as AF window 913.

It should be noted that LBT procedure 912, 914, and 915 can be Type 1 or Type 2, depending on whether COT 908 is initiated by base station 105 and shared with UE 115 or not.

Figure 10A:
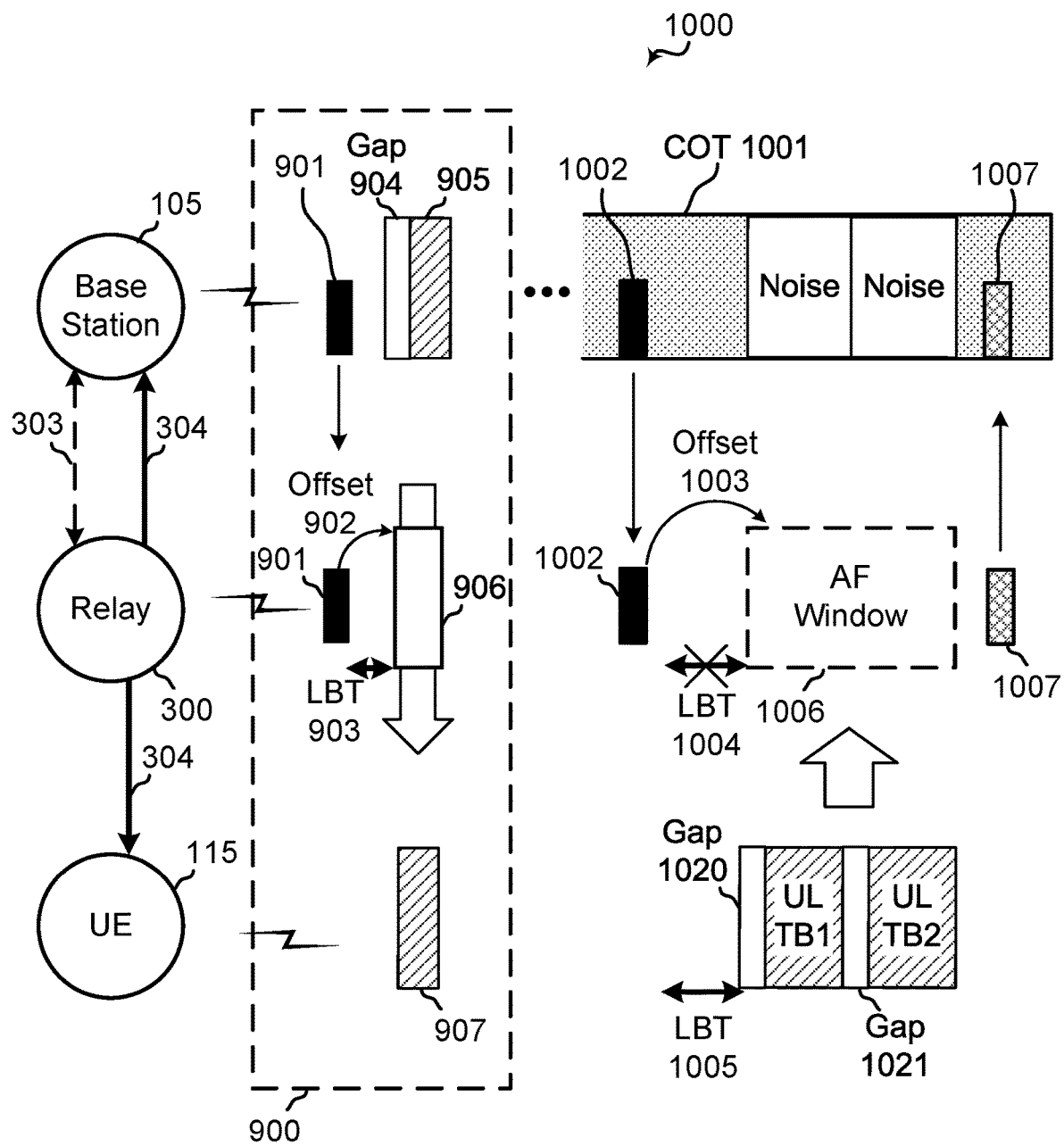
FIGS. 10A-10B are block diagrams illustrating a relay node within NRU networks providing AF operations on communications between a base station and UE that supports network controlled repeater operation at NRU bands according to one or more aspects.
Figure 10B:
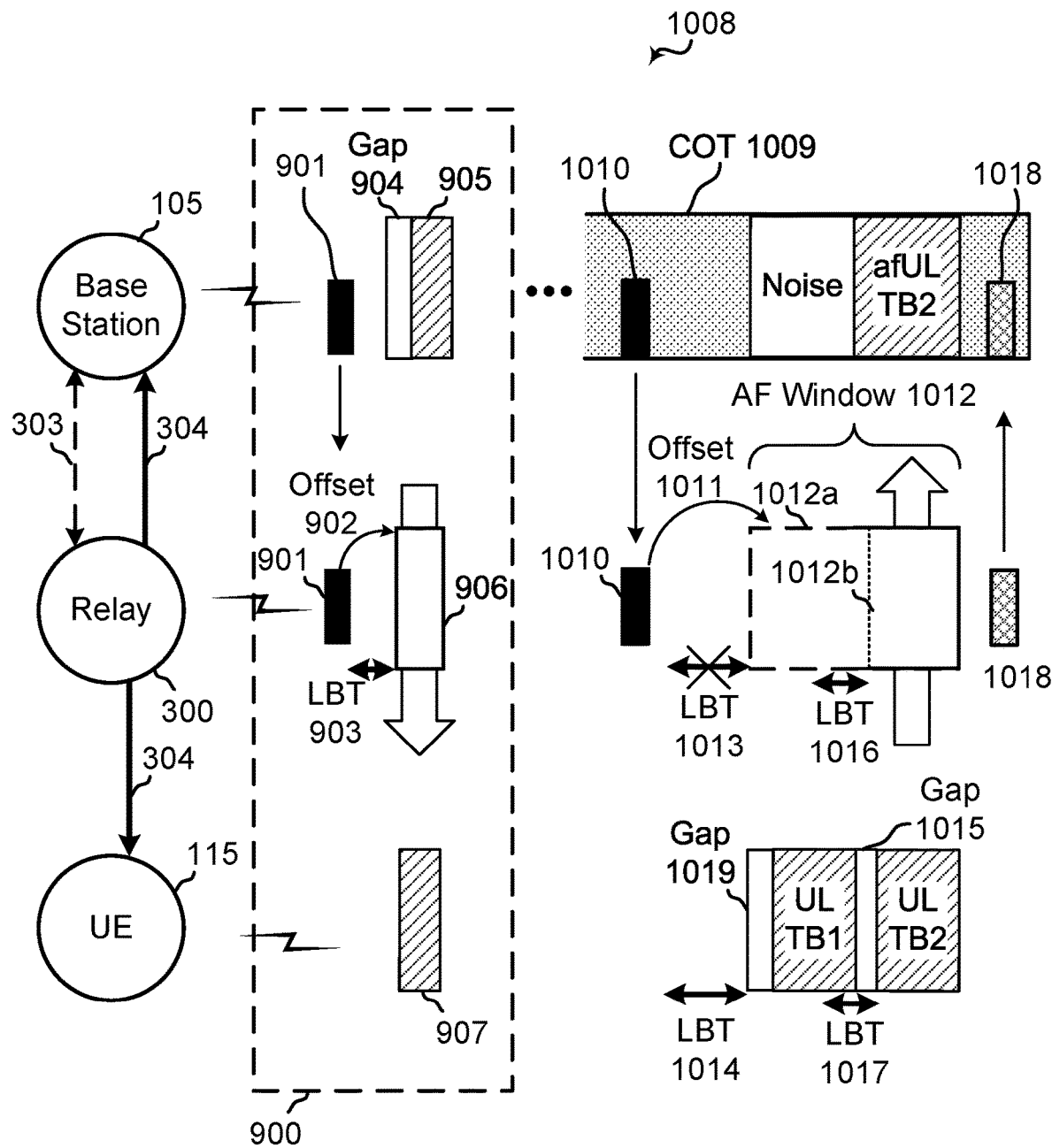

FIGS. 10A and 10B are block diagrams illustrating a relay node 300 within NRU networks 1000 and 1008 providing AF operations on communications between base station 105 and UE 115 that supports network controlled repeater operation at NRU bands according to one or more aspects. As noted above, relay node 300 is controlled via control path 303 by base station 105 with uplink and downlink communications between base station 105 and UE 115 repeated by relay node 300, via data path 304. The example aspects of FIGS. 10A and 10B illustrate repeater functionality with respect to uplink communications from UE 115. Uplink grant procedure 900 may be conducted within COT 908 or within a COT earlier than COT 908. Within uplink grant procedure 900, base station 105 signals repeater control message 901 to relay node 300 that includes offset 902 scheduling AF window 906. Base station 105 provides gap 904 prior to transmitting uplink grant signal 905. Relay node 300 successfully conducts LBT procedure 903 within gap 904, after which it performs AF operations within AF window 906 to forward uplink grant signal 905 which may be received as afUL grant 907. Uplink grant 907 schedules UE 115 for uplink transmissions at uplink TB1 and uplink TB2.

In the example aspect illustrated in FIG. 10A, within COT 1001, base station 105 signals repeater control message 1002 to relay node 300. Repeater control message 1002 includes an offset 1003 that schedules AF window 1006. UE 115 provides gap 1020 prior to transmission of uplink TB1 and gap 1021 prior to transmission of uplink TB2 within which relay node 300 may conduct LBT procedures. During gap 1020, relay node 300 performs LBT 1004, which is detected to fail. In response to failure of LBT procedure 1004, relay node 300 refrains from conducting AF operations within AF window 1006. Thus, base station 105 would receive noise instead of the forwarded uplink TB1 and uplink TB2 from UE 115. After AF window 1006, relay node 300 would transmit LBT status report 1007 that identifies at least the failure of LBT procedure 1004 to base station 105. Such status information may then allow base station 105 to schedule retransmission of the uplink transmissions by UE 115.

In the example aspect illustrated in FIG. 10B, within COT 1009, base station 105 signals repeater control message 1010 to relay node 300. Repeater control message 1010 includes an offset 1011 that schedules AF window 1012, but also includes a list of multiple candidate occasions (e.g., AF windows 1012a-1012b) for performing LBT procedures within AF window 1012. During gap 1019, relay node 300 unsuccessfully performs LBT procedure 1013, and relay node 300, in response, refrains from conducting AF operations within the occasion of AF window 1012a. Accordingly, base station 105 would receive noise even though, after successfully completing LBT 1014, UE 115 transmits uplink TB1. Relay node 300 would perform LBT procedure 1016 during gap 1017 provided by UE 115 before UE 115 transmits uplink TB2. Upon detecting success of LBT procedure 1016, relay node 300 conducts AF operations with the next occasion of AF window 1012b). Accordingly, base station 105 receives afUL TB2 forwarded by relay node 300 from the transmission of uplink TB2 by UE 115. After AF window 1012, relay node 300 transmits LBT status report 1018 to base station 105, which identifies at least the failure of LBT procedure 1013.

FIG. 11 is a block diagrams illustrating a relay node 300 within NRU network 1100 providing AF operations on communications between base station 105 and UE 115 that supports network controlled repeater operation at NRU bands according to one or more aspects. As noted above, relay node 300 is controlled via control path 303 by base station 105 with uplink and downlink communications between base station 105 and UE 115 repeated by relay node 300, via data path 304. The example aspects of FIGS. 10A and 10B illustrate repeater functionality with respect to uplink communications from UE 115. Uplink grant procedure 900 may be conducted within COT 908 or within a COT earlier than COT 908. Within uplink grant procedure 900, base station 105 signals repeater control message 901 to relay node 300 that includes offset 902 scheduling AF window 906. Base station 105 provides gap 904 prior to transmitting uplink grant signal 905. Relay node 300 successfully conducts LBT procedure 903 within gap 904, after which it performs AF operations within AF window 906 to forward uplink grant signal 905 which may be received as afUL grant 907. Uplink grant 907 schedules UE 115 for uplink transmissions at uplink TB.

Base station 105 signals repeater control message 1101 to relay node 300. Repeater control message 1101 may be transmitted by base station 105 in the same COT as uplink grant procedure or a subsequent COT. The COT may be initiated either by base station 105 or UE 115. Repeater control message 1101 includes offset 1102 that defines AF window 1103. Repeater control message 1101 may further include an indication that AF operations within AF window 1103 may be triggered by a trigger signal. Prior to the scheduled uplink transmission of uplink TB, UE 115 successfully performs LBT procedure 1103. In response to success of LBT procedure 1103, UE 115 transmits trigger signal 1104 to relay node 300. Relay node 300 determines that trigger signal 1104 has been received within offset 1102 and performs LBT procedure 1106 within gap 1105 provided by UE 115 prior to transmitting uplink TB. After detecting success of LBT procedure 1106, relay node 300 conducts AF operations within AF window 1103. Accordingly, base station 105 will receive afUL TB forwarded by relay node 300 within AF window 1103 from uplink TB transmitted by UE 115.

Figure 13:
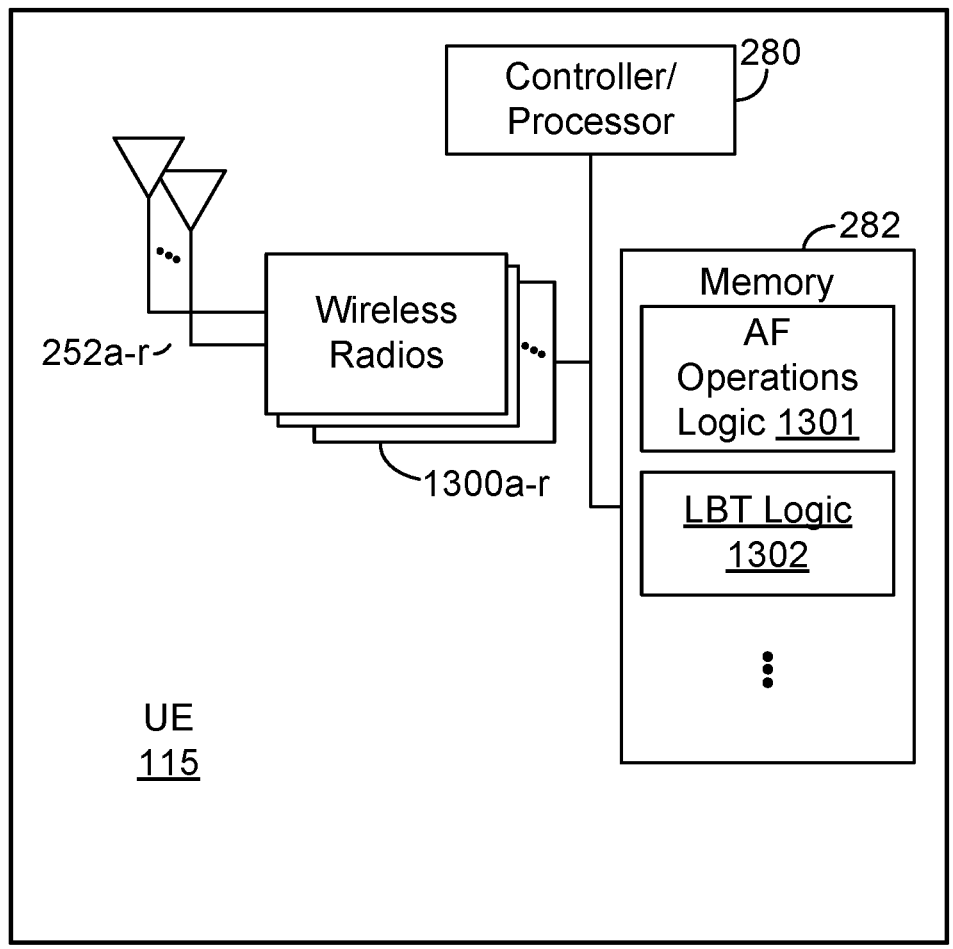
FIG. 13 is a block diagram of an example UE that supports network controlled repeater operation at NRU bands according to one or more aspects.

It is noted that one or more blocks (or operations) described with reference to FIGS. 4A-4C may be combined with one or more blocks (or operations) described with reference to another of the figures. For example, one or more blocks (or operations) of FIGS. 4A-4C may be combined with one or more blocks (or operations) of FIGS. 5-11. As another example, one or more blocks associated with FIG. 4A-4C may be combined with one or more blocks (or operations) associated with FIGS. 1-2. Additionally, or alternatively, one or more operations described above with reference to FIGS. 1-2 may be combined with one or more operations described with reference to FIGS. 12-14.

In one or more aspects, techniques for supporting network controlled repeater operation at NRU bands may include additional aspects, such as any single aspect or any combination of aspects described below or in connection with one or more other processes or devices described elsewhere herein. In one or more aspects, provide network controlled repeater operation at NRU bands may include a relay node configured to receive, by the relay node, a scheduling message from a serving base station, wherein the scheduling message identifies an AF window and an offset prior to a beginning of the AF window. The relay node is further configured to perform, by the relay node, an LBT procedure on a shared communication channel, wherein the LBT procedure is performed within the offset before the AF window. The relay node is further configured to refrain, by the relay node, from AF operations within the AF window in response to failure of the LBT procedure. The relay node is further configured to perform, by the relay node, the AF operations on all received signals during the AF window in response to success of the LBT procedure. Additionally, the apparatus may perform or operate according to one or more aspects as described below. In some implementations, the apparatus includes a wireless device, such as a repeater or relay node. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

A first aspect of wireless communication performed by a relay node includes receiving, by the relay node, a scheduling message from a serving base station, wherein the scheduling message identifies an AF window and an offset prior to a beginning of the AF window; performing, by the relay node, an LBT procedure on a shared communication channel, wherein the LBT procedure is performed within the offset before the AF window; refraining, by the relay node, from AF operations within the AF window in response to failure of the LBT procedure; and performing, by the relay node, the AF operations on all received signals during the AF window in response to success of the LBT procedure.

In a second aspect, alone or in combination with the first aspect, wherein the scheduling message identifies the offset relative to the scheduling message, and wherein the AF window identified is at a fixed location associated with the offset from the scheduling message.

In a third aspect, alone or in combination with one or more of the first aspect and the second aspect, further including: monitoring, by the relay node, for a triggering signal, wherein the scheduling message defines the offset relative to the triggering signal and wherein a location of the AF window floats relative to the triggering signal; and refraining, by the relay node, from the performing the LBT procedure in response to a failure to receive the triggering signal, and wherein the performing the LBT procedure within the offset before the AF window is in response to receipt of the triggering signal.

In a fourth aspect, alone or in combination with one or more of the first aspect through the third aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In a fifth aspect, alone or in combination with one or more of the first aspect through the fourth aspect, wherein the receipt of the triggering signal includes receiving the triggering signal from one of the serving base station or a neighboring UE, and wherein the received signals on which the AF operations are performed include one of: received downlink signals from the serving base station or received uplink signals from a neighboring UE.

In a sixth aspect, alone or in combination with one or more of the first aspect through the fifth aspect, wherein the scheduling message is received within a first COT and the AF window is located within a subsequent COT.

In a seventh aspect, alone or in combination with one or more of the first aspect through the sixth aspect, wherein the subsequent COT includes one of: a UE-initiated COT when the received signals are received uplink signals from the neighboring UE, or a base station-initiated COT when the received signals are received downlink signals from the serving base station.

In an eighth aspect, alone or in combination with one or more of the first aspect through the seventh aspect, further including: monitoring, by the relay node, for a triggering signal, wherein the scheduling message further defines an activation of the AF window in response to a receipt of the triggering signal and wherein the AF window identified is at a fixed location associated with the offset from the scheduling message; and refraining, by the relay node, from the performing the LBT procedure in response to a failure to receive the triggering signal within the offset, and wherein the performing the LBT procedure within the offset before the AF window is in response to the receipt of the triggering signal within the offset.

In a ninth aspect, alone or in combination with one or more of the first aspect through the eighth aspect, wherein the scheduling message defines the activation of the AF window in response to the receipt of the triggering signal within the offset.

In a tenth aspect, alone or in combination with one or more of the first aspect through the ninth aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In an eleventh aspect, alone or in combination with one or more of the first aspect through the tenth aspect, wherein the receipt of the triggering signal includes receiving the triggering signal from one of the serving base station or a neighboring UE, and wherein the received signals on which the AF operations are performed include one of: received downlink signals from the serving base station or received uplink signals from a neighboring UE.

In a twelfth aspect, alone or in combination with one or more of the first aspect through the eleventh aspect, wherein the scheduling message is received within a first COT and the AF window is located within a subsequent COT.

In a thirteenth aspect, alone or in combination with one or more of the first aspect through the twelfth aspect, wherein the subsequent COT includes one of: a UE-initiated COT when the received signals are received uplink signals from the neighboring UE, or a base station-initiated COT when the received signals are received downlink signals from the serving base station.

In a fourteenth aspect, alone or in combination with one or more of the first aspect through the thirteenth aspect, wherein the scheduling message further defines a plurality of LBT occasions within the AF window, wherein the performing the LBT procedure and the one of: the refraining from the AF operations, or the performing the AF operations are conducted for each of the plurality of LBT occasions within the AF window.

In a fifteenth aspect, alone or in combination with one or more of the first aspect through the fourteenth aspect, wherein the received signals on which the AF operations are performed for each of the plurality of LBT occasions include one of: received downlink signals from the serving base station or received uplink signals from a neighboring UE.

In a sixteenth aspect, alone or in combination with one or more of the first aspect through the fifteenth aspect, wherein the received signals on which the AF operations are performed include one of: received downlink signals from the serving base station or received uplink signals from a neighboring UE.

In a seventeenth aspect, alone or in combination with one or more of the first aspect through the sixteenth aspect, further including: receiving, by the relay node, an LBT status report scheduling message from the serving base station prior to the scheduling message, wherein the LBT status report scheduling messages schedules transmission of the LBT status report one of: periodically or aperiodically.

In an eighteenth aspect, alone or in combination with one or more of the first aspect through the seventeenth aspect, further including: transmitting, by the relay node, an LBT status report to the serving base station, wherein the LBT status report includes a status of the LBT procedure performed by the relay node within the offset.

A nineteenth aspect configured for wireless communication, includes a relay node with at least one processor; and a memory coupled to the at least one processor, wherein the at least one processor is configured: to receive, by the relay node, a scheduling message from a serving base station, wherein the scheduling message identifies an AF window and an offset prior to a beginning of the AF window; to perform, by the relay node, an LBT procedure on a shared communication channel, wherein the LBT procedure is performed within the offset before the AF window; to refrain, by the relay node, from AF operations within the AF window in response to failure of the LBT procedure; and to perform, by the relay node, the AF operations on all received signals during the AF window in response to success of the LBT procedure.

In a twentieth aspect, alone or in combination with the nineteenth aspect, wherein the scheduling message identifies the offset relative to the scheduling message, and wherein the AF window identified is at a fixed location associated with the offset from the scheduling message.

In a twenty-first aspect, alone or in combination with one or more of the nineteenth aspect or the twentieth aspect, further including configuration of the at least one processor: to monitor, by the relay node, for a triggering signal, wherein the scheduling message defines the offset relative to the triggering signal and wherein a location of the AF window floats relative to the triggering signal; and to refrain, by the relay node, from the performing the LBT procedure in response to a failure to receive the triggering signal, and wherein the configuration of the at least one processor to perform the LBT procedure within the offset before the AF window is in response to receipt of the triggering signal.

In a twenty-second aspect, alone or in combination with one or more of the nineteenth aspect through the twenty-first aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In a twenty-third aspect, alone or in combination with one or more of the nineteenth aspect through the twenty-second aspect, wherein the receipt of the triggering signal includes receiving the triggering signal from one of the serving base station or a neighboring UE, and wherein the received signals on which the AF operations are performed include one of: received downlink signals from the serving base station or received uplink signals from a neighboring UE.

In a twenty-fourth aspect, alone or in combination with one or more of the nineteenth aspect through the twenty-third aspect, wherein the scheduling message is received within a first COT and the AF window is located within a subsequent COT.

In a twenty fifth aspect, alone or in combination with one or more of the nineteenth aspect through the twenty-fourth aspect, wherein the subsequent COT includes one of: a UE-initiated COT when the received signals are received uplink signals from the neighboring UE, or a base station-initiated COT when the received signals are received downlink signals from the serving base station.

In a twenty-sixth aspect, alone or in combination with one or more of the nineteenth aspect through the twenty-fifth aspect, further including configuration of the at least one processor: to monitor, by the relay node, for a triggering signal, wherein the scheduling message further defines an activation of the AF window in response to a receipt of the triggering signal and wherein the AF window identified is at a fixed location associated with the offset from the scheduling message; and to refrain, by the relay node, from executing the configuration of the at least one processor to perform the LBT procedure in response to a failure to receive the triggering signal within the offset, and wherein the configuration of the at least one processor to perform the LBT procedure within the offset before the AF window is in response to the receipt of the triggering signal within the offset.

In a twenty-seventh aspect, alone or in combination with one or more of the nineteenth aspect through the twenty-sixth aspect, wherein the scheduling message defines the activation of the AF window in response to the receipt of the triggering signal within the offset.

In a twenty-eighth aspect, alone or in combination with one or more of the nineteenth aspect through the twenty-seventh aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In a twenty-ninth aspect, alone or in combination with one or more of the nineteenth aspect through the twenty-eighth aspect, wherein the receipt of the triggering signal includes configuration of the at least one processor to receive the triggering signal from one of the serving base station or a neighboring UE, and wherein the received signals on which the AF operations are performed include one of: received downlink signals from the serving base station or received uplink signals from a neighboring UE.

In a thirtieth aspect, alone or in combination with one or more of the nineteenth aspect through the twenty-ninth aspect, wherein the scheduling message is received within a first COT and the AF window is located within a subsequent COT.

In a thirty-first aspect, alone or in combination with one or more of the nineteenth aspect through the thirtieth aspect, wherein the subsequent COT includes one of: a UE-initiated COT when the received signals are received uplink signals from the neighboring UE, or a base station-initiated COT when the received signals are received downlink signals from the serving base station.

In a thirty-second aspect, alone or in combination with one or more of the nineteenth aspect through the thirty-first aspect, wherein the scheduling message further defines a plurality of LBT occasions within the AF window, wherein the configuration of the at least one processor to perform the LBT procedure and the one of: the configuration of the at least one processor to refrain from the AF operations, or the configuration of the at least one processor to perform the AF operations are conducted for each of the plurality of LBT occasions within the AF window.

In a thirty-third aspect, alone or in combination with one or more of the nineteenth aspect through the thirty-second aspect, wherein the received signals on which the AF operations are performed for each of the plurality of LBT occasions include one of: received downlink signals from the serving base station or received uplink signals from a neighboring UE.

In a thirty-fourth aspect, alone or in combination with one or more of the nineteenth aspect through the thirty-third aspect, wherein the received signals on which the AF operations are performed include one of: received downlink signals from the serving base station or received uplink signals from a neighboring UE.

In a thirty-fifth aspect, alone or in combination with one or more of the nineteenth aspect through the thirty-fourth aspect, further including configuration of the at least one processor: to receive, by the relay node, an LBT status report scheduling message from the serving base station prior to the scheduling message, wherein the LBT status report scheduling messages schedules transmission of the LBT status report one of: periodically or aperiodically.

In a thirty-sixth aspect, alone or in combination with one or more of the nineteenth aspect through the thirty-fifth aspect, further including configuration of the at least one processor: to transmit, by the relay node, an LBT status report to the serving base station, wherein the LBT status report includes a status of the LBT procedure performed by the relay node within the offset.

A thirty-seventh aspect configured for wireless communication, includes means for receiving, by a relay node, a scheduling message from a serving base station, wherein the scheduling message identifies an AF window and an offset prior to a beginning of the AF window; means for performing, by the relay node, an LBT procedure on a shared communication channel, wherein the LBT procedure is performed within the offset before the AF window; means for refraining, by the relay node, from AF operations within the AF window in response to failure of the LBT procedure; and means for performing, by the relay node, the AF operations on all received signals during the AF window in response to success of the LBT procedure.

In a thirty-eighth aspect, alone or in combination with the thirty-seventh aspect, wherein the scheduling message identifies the offset relative to the scheduling message, and wherein the AF window identified is at a fixed location associated with the offset from the scheduling message.

In a thirty-ninth aspect, alone or in combination with one or more of the thirty-seventh aspect and the thirty-eighth aspect, further including: means for monitoring, by the relay node, for a triggering signal, wherein the scheduling message defines the offset relative to the triggering signal and wherein a location of the AF window floats relative to the triggering signal; and means for refraining, by the relay node, from execution of the means for performing the LBT procedure in response to a failure to receive the triggering signal, and wherein the means for performing the LBT procedure within the offset before the AF window is in response to receipt of the triggering signal.

In a fortieth aspect, alone or in combination with one or more of the thirty-seventh aspect through the thirty-ninth aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In a forty-first aspect, alone or in combination with one or more of the thirty-seventh aspect through the fortieth aspect, wherein the receipt of the triggering signal includes receiving the triggering signal from one of the serving base station or a neighboring UE, and wherein the received signals on which the AF operations are performed include one of: received downlink signals from the serving base station or received uplink signals from a neighboring UE.

In a forty-second aspect, alone or in combination with one or more of the thirty-seventh aspect through the forty-first aspect, wherein the scheduling message is received within a first COT and the AF window is located within a subsequent COT.

In a forty-third aspect, alone or in combination with one or more of the thirty-seventh aspect through the forty-second aspect, wherein the subsequent COT includes one of: a UE-initiated COT when the received signals are received uplink signals from the neighboring UE, or a base station-initiated COT when the received signals are received downlink signals from the serving base station.

In a forty-fourth aspect, alone or in combination with one or more of the thirty-seventh aspect through the forty-third aspect, further including: means for monitoring, by the relay node, for a triggering signal, wherein the scheduling message further defines an activation of the AF window in response to a receipt of the triggering signal and wherein the AF window identified is at a fixed location associated with the offset from the scheduling message; and means for refraining, by the relay node, from execution of the means for performing the LBT procedure in response to a failure to receive the triggering signal within the offset, and wherein the means for performing the LBT procedure within the offset before the AF window is in response to the receipt of the triggering signal within the offset.

In a forty-fifth aspect, alone or in combination with one or more of the thirty-seventh aspect through the forty-fourth aspect, wherein the scheduling message defines the activation of the AF window in response to the receipt of the triggering signal within the offset.

In a forty-sixth aspect, alone or in combination with one or more of the thirty-seventh aspect through the forty-fifth aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In a forty-seventh aspect, alone or in combination with one or more of the thirty-seventh aspect through the forty-sixth aspect, wherein the receipt of the triggering signal includes receiving the triggering signal from one of the serving base station or a neighboring UE, and wherein the received signals on which the AF operations are performed include one of: received downlink signals from the serving base station or received uplink signals from a neighboring UE.

In a forty-eighth aspect, alone or in combination with one or more of the thirty-seventh aspect through the forty-seventh, wherein the scheduling message is received within a first COT and the AF window is located within a subsequent COT.

In a forty-ninth aspect, alone or in combination with one or more of the thirty-seventh aspect through the forty-eighth aspect, wherein the subsequent COT includes one of: a UE-initiated COT when the received signals are received uplink signals from the neighboring UE, or a base station-initiated COT when the received signals are received downlink signals from the serving base station.

In a fiftieth aspect, alone or in combination with one or more of the thirty-seventh aspect through the forty-ninth aspect, wherein the scheduling message further defines a plurality of LBT occasions within the AF window, wherein the means for performing the LBT procedure and the one of: the means for refraining from the AF operations, or the means for performing the AF operations are conducted for each of the plurality of LBT occasions within the AF window.

In a fifty-first aspect, alone or in combination with one or more of the thirty-seventh aspect through the fiftieth aspect, wherein the received signals on which the AF operations are performed for each of the plurality of LBT occasions include one of: received downlink signals from the serving base station or received uplink signals from a neighboring UE.

In a fifty-second aspect, alone or in combination with one or more of the thirty-seventh aspect through the fifty-first aspect, wherein the received signals on which the AF operations are performed include one of: received downlink signals from the serving base station or received uplink signals from a neighboring UE.

In a fifty-third aspect, alone or in combination with one or more of the thirty-seventh aspect through the fifty-second aspect, further including: means for receiving, by the relay node, an LBT status report scheduling message from the serving base station prior to the scheduling message, wherein the LBT status report scheduling messages schedules transmission of the LBT status report one of: periodically or aperiodically.

In a fifty-fourth aspect, alone or in combination with one or more of the thirty-seventh aspect through the fifty-third aspect, further including: means for transmitting, by the relay node, an LBT status report to the serving base station, wherein the LBT status report includes a status of the LBT procedure performed by the relay node within the offset.

A fifty-fifth aspect includes a relay node with a non-transitory computer-readable medium having program code recorded thereon, the program code includes program code executable by a computer for causing the computer to receive, by the relay node, a scheduling message from a serving base station, wherein the scheduling message identifies an AF window and an offset prior to a beginning of the AF window; program code executable by the computer for causing the computer to perform, by the relay node, an LBT procedure on a shared communication channel, wherein the LBT procedure is performed within the offset before the AF window; program code executable by the computer for causing the computer to refrain, by the relay node, from AF operations within the AF window in response to failure of the LBT procedure; and program code executable by the computer for causing the computer to perform, by the relay node, the AF operations on all received signals during the AF window in response to success of the LBT procedure.

In a fifty-sixth aspect, alone or in combination with the fifty-fifth aspect, wherein the scheduling message identifies the offset relative to the scheduling message, and wherein the AF window identified is at a fixed location associated with the offset from the scheduling message.

In a fifty-seventh aspect, alone or in combination with one or more of the fifty-fifth aspect and the fifty-sixth aspect, further including program code executable by the computer for causing the computer: to monitor, by the relay node, for a triggering signal, wherein the scheduling message defines the offset relative to the triggering signal and wherein a location of the AF window floats relative to the triggering signal; and to refrain, by the relay node, from execution of the program code executable by the computer for causing the computer to perform the LBT procedure in response to a failure to receive the triggering signal, and wherein the program code executable by the computer for causing the computer to perform the LBT procedure within the offset before the AF window is in response to receipt of the triggering signal.

In a fifty-eighth aspect, alone or in combination with one or more of the fifty-fifth aspect through the fifty-seventh aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In a fifty-ninth aspect, alone or in combination with one or more of the fifty-fifth aspect through the fifty-eighth aspect, wherein the receipt of the triggering signal includes receiving the triggering signal from one of the serving base station or a neighboring UE, and wherein the received signals on which the AF operations are performed include one of: received downlink signals from the serving base station or received uplink signals from a neighboring UE.

In a sixtieth aspect, alone or in combination with one or more of the fifty-fifth aspect through the fifty-ninth aspect, wherein the scheduling message is received within a first COT and the AF window is located within a subsequent COT.

In a sixty-first aspect, alone or in combination with one or more of the fifty-fifth aspect through the sixtieth aspect, wherein the subsequent COT includes one of: a UE-initiated COT when the received signals are received uplink signals from the neighboring UE, or a base station-initiated COT when the received signals are received downlink signals from the serving base station.

In a sixty-second aspect, alone or in combination with one or more of the fifty-fifth aspect through the sixty-first aspect, further including program code executable by the computer for causing the computer: to monitor, by the relay node, for a triggering signal, wherein the scheduling message further defines an activation of the AF window in response to a receipt of the triggering signal and wherein the AF window identified is at a fixed location associated with the offset from the scheduling message; and to refrain, by the relay node, from executing the program code executable by the computer for causing the computer to perform the LBT procedure in response to a failure to receive the triggering signal within the offset, and wherein the program code executable by the computer for causing the computer to perform the LBT procedure within the offset before the AF window is in response to the receipt of the triggering signal within the offset.

In a sixty-third aspect, alone or in combination with one or more of the fifty-fifth aspect through the sixty-second aspect, wherein the scheduling message defines the activation of the AF window in response to the receipt of the triggering signal within the offset.

In a sixty-fourth aspect, alone or in combination with one or more of the fifty-fifth aspect through the sixty-third aspect, wherein the triggering signal includes one of: a DCI message, wherein the relay node decodes the triggering signal from the DCI message; or a predetermined reference signal, wherein the relay node identifies the triggering signal on detection of the predetermined reference signal.

In a sixty-fifth aspect, alone or in combination with one or more of the fifty-fifth aspect through the sixty-fourth aspect, wherein the receipt of the triggering signal includes program code executable by the computer for causing the computer to receive the triggering signal from one of the serving base station or a neighboring UE, and wherein the received signals on which the AF operations are performed include one of: received downlink signals from the serving base station or received uplink signals from a neighboring UE.

In a sixty-sixth aspect, alone or in combination with one or more of the fifty-fifth aspect through the sixty-fifth aspect, wherein the scheduling message is received within a first COT and the AF window is located within a subsequent COT.

In a sixty-seventh aspect, alone or in combination with one or more of the fifty-fifth aspect through the sixty-sixth aspect, wherein the subsequent COT includes one of: a UE-initiated COT when the received signals are received uplink signals from the neighboring UE, or a base station-initiated COT when the received signals are received downlink signals from the serving base station.

In a sixty-eighth aspect, alone or in combination with one or more of the fifty-fifth aspect through the sixty-seventh aspect, wherein the scheduling message further defines a plurality of LBT occasions within the AF window, wherein the program code executable by the computer for causing the computer to perform the LBT procedure and the one of: the program code executable by the computer for causing the computer to refrain from the AF operations, or the program code executable by the computer for causing the computer to perform the AF operations are conducted for each of the plurality of LBT occasions within the AF window.

In a sixty-ninth aspect, alone or in combination with one or more of the fifty-fifth aspect through the sixty-eighth aspect, wherein the received signals on which the AF operations are performed for each of the plurality of LBT occasions include one of: received downlink signals from the serving base station or received uplink signals from a neighboring UE.

In a seventieth aspect, alone or in combination with one or more of the fifty-fifth aspect through the sixty-ninth aspect, wherein the received signals on which the AF operations are performed include one of: received downlink signals from the serving base station or received uplink signals from a neighboring UE.

In a seventy-first aspect, alone or in combination with one or more of the fifty-fifth aspect through the seventieth aspect, further including program code executable by the computer for causing the computer: to receive, by the relay node, an LBT status report scheduling message from the serving base station prior to the scheduling message, wherein the LBT status report scheduling messages schedules transmission of the LBT status report one of: periodically or aperiodically.

In a seventy-second aspect, alone or in combination with one or more of the fifty-fifth aspect through the seventy-first aspect, further including program code executable by the computer for causing the computer: to transmit, by the relay node, an LBT status report to the serving base station, wherein the LBT status report includes a status of the LBT procedure performed by the relay node within the offset.

In one or more aspects, techniques for supporting network controlled repeater operation at NRU bands may include additional aspects, such as any single aspect or any combination of aspects described below or in connection with one or more other processes or devices described elsewhere herein. In one or more aspects, supporting network controlled repeater operation at NRU bands may include an apparatus configured to successfully perform, by a base station, an LBT procedure to establish a COT. The apparatus is further configured to transmit, by the base station, a scheduling message to a relay node, wherein the scheduling message identifies an AF window and an offset prior to a beginning of the AF window. The apparatus is further configured to transmit, by the base station, downlink signals to the relay node, wherein the downlink signals are transmitted after a gap period scheduled to allow a relay station LBT procedure.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

A seventy-third aspect configured for wireless communication performed by a base station includes successfully performing, by the base station, an LBT procedure to establish a COT; transmitting, by the base station, a scheduling message to a relay node, wherein the scheduling message identifies an AF window and an offset prior to a beginning of the AF window; and transmitting, by the base station, downlink signals to the relay node, wherein the downlink signals are transmitted after a gap period scheduled to allow a relay station LBT procedure.

In a seventy-fourth aspect, alone or in combination with the seventy-third aspect, further including: successfully performing, by the base station, a subsequent LBT procedure to establish a subsequent COT, wherein the transmitting the downlink signals occurs during the subsequent COT.

A seventy-fifth aspect configured for wireless communication, a base station includes at least one processor; and a memory coupled to the at least one processor, wherein the at least one processor is configured: to successfully perform, by the base station, an LBT procedure to establish a COT; to transmit, by the base station, a scheduling message to a relay node, wherein the scheduling message identifies an AF window and an offset prior to a beginning of the AF window; and to transmit, by the base station, downlink signals to the relay node, wherein the downlink signals are transmitted after a gap period scheduled to allow a relay station LBT procedure.

In a seventy-sixth aspect, alone or in combination with the seventy-fifth aspect, further including configuration of the at least one processor: to successfully perform, by the base station, a subsequent LBT procedure to establish a subsequent COT, wherein execution of the configuration of the at least one processor to transmit the downlink signals occurs during the subsequent COT.

A seventy-seventh aspect configured for wireless communication includes means for successfully performing, by a base station, an LBT procedure to establish a COT; means for transmitting, by the base station, a scheduling message to a relay node, wherein the scheduling message identifies an AF window and an offset prior to a beginning of the AF window; and means for transmitting, by the base station, downlink signals to the relay node, wherein the downlink signals are transmitted after a gap period scheduled to allow a relay station LBT procedure.

In a seventy-eighth aspect, alone or in combination with the seventy-seventh aspect, further including: means for successfully performing, by the base station, a subsequent LBT procedure to establish a subsequent COT, wherein execution of the means for transmitting the downlink signals occurs during the subsequent COT.

A seventy-ninth aspect includes a base station with a non-transitory computer-readable medium having program code recorded thereon, the program code includes program code executable by a computer for causing the computer to successfully perform, by the base station, an LBT procedure to establish a COT; program code executable by the computer for causing the computer to transmit, by the base station, a scheduling message to a relay node, wherein the scheduling message identifies an AF window and an offset prior to a beginning of the AF window; and program code executable by the computer for causing the computer to transmit, by the base station, downlink signals to the relay node, wherein the downlink signals are transmitted after a gap period scheduled to allow a relay station LBT procedure.

An eightieth aspect, alone or in combination with the seventy-ninth aspect, further including program code executable by the computer for causing the computer: to successfully perform, by the base station, a subsequent LBT procedure to establish a subsequent COT, wherein execution of the program code executable by the computer for causing the computer to transmit the downlink signals occurs during the subsequent COT.

In one or more aspects, techniques for supporting network controlled repeater operation at NRU bands may include additional aspects, such as any single aspect or any combination of aspects described below or in connection with one or more other processes or devices described elsewhere herein. In one or more aspects, provide network controlled repeater operation at NRU bands may include an apparatus configured to obtain, by the UE, an indication of AF operations for communications through a relay node. The apparatus is further configured to receive, by the UE, an uplink transmission grant allocating uplink resources. The apparatus is further configured to transmit, by the UE, uplink signals to the relay node, wherein the uplink signals are transmitted after a gap period scheduled to allow a relay station LBT procedure. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

An eighty-first aspect configured for wireless communication performed by a UE, includes obtaining, by the UE, an indication of AF operations for communications through a relay node; receiving, by the UE, an uplink transmission grant allocating uplink resources; and transmitting, by the UE, uplink signals to the relay node, wherein the uplink signals are transmitted after a gap period scheduled to allow a relay station LBT procedure.

In an eighty-second aspect, alone or in combination with the eighty-first aspect, further including: successfully performing, by the UE, an LBT procedure to establish a UE-initiated COT including the uplink resources, wherein the transmitting the uplink signals occurs during the UE-initiated COT.

An eighty-third configured for wireless communication, includes a UE with at least one processor; and a memory coupled to the at least one processor, wherein the at least one processor is configured: to obtain, by the UE, an indication of AF operations for communications through a relay node; to receive, by the UE, an uplink transmission grant allocating uplink resources; and to transmit, by the UE, uplink signals to the relay node, wherein the uplink signals are transmitted after a gap period scheduled to allow a relay station LBT procedure.

In an eighty-fourth aspect, alone or in combination with the eighty-third aspect, further including configuration of the at least one processor: to successfully perform, by the UE, an LBT procedure to establish a UE-initiated COT including the uplink resources, wherein execution of the configuration of the at least one processor to transmit the uplink signals occurs during the UE-initiated COT.

An eighty-fifth aspect configured for wireless communication, includes means for obtaining, by a UE, an indication of AF operations for communications through a relay node; means for receiving, by the UE, an uplink transmission grant allocating uplink resources; and means for transmitting, by the UE, uplink signals to the relay node, wherein the uplink signals are transmitted after a gap period scheduled to allow a relay station LBT procedure.

In an eighty-sixth aspect, alone or in combination with the eighty-fifth aspect, further including: means for successfully performing, by the UE, an LBT procedure to establish a UE-initiated COT including the uplink resources, wherein the transmitting the uplink signals occurs during the UE-initiated COT.

An eighty-seventh aspect includes a UE with a non-transitory computer-readable medium having program code recorded thereon, the program code includes program code executable by a computer for causing the computer to obtain, by the UE, an indication of AF operations for communications through a relay node; program code executable by the computer for causing the computer to receive, by the UE, an uplink transmission grant allocating uplink resources; and program code executable by the computer for causing the computer to transmit, by the UE, uplink signals to the relay node, wherein the uplink signals are transmitted after a gap period scheduled to allow a relay station LBT procedure.

In an eighty-eighth aspect, alone or in combination with the eighty-seventh aspect, further including program code executable by the computer for causing the computer: to successfully perform, by the UE, an LBT procedure to establish a UE-initiated COT including the uplink resources, wherein execution of the program code executable by the computer for causing the computer to transmit the uplink signals occurs during the UE-initiated COT.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-14 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a relay node, the method comprising:
   receiving, by the relay node, a scheduling message from a serving base station, wherein the scheduling message identifies an amplify and forward (AF) window and an offset prior to a beginning of the AF window;
   performing, by the relay node, a listen before talk (LBT) procedure on a shared communication channel, wherein the LBT procedure is performed within the offset before the AF window;
   refraining, by the relay node, from AF operations within the AF window in response to failure of the LBT procedure; and
   performing, by the relay node, the AF operations on all received signals during the AF window in response to success of the LBT procedure.

2. The method of claim 1,
   wherein the scheduling message identifies the offset relative to the scheduling message, and
   wherein the AF window identified is at a fixed location associated with the offset from the scheduling message.

3. The method of claim 1, further including:
   monitoring, by the relay node, for a triggering signal, wherein the scheduling message defines the offset relative to the triggering signal and wherein a location of the AF window floats relative to the triggering signal; and
   refraining, by the relay node, from the performing the LBT procedure in response to a failure to receive the triggering signal, and
   wherein the performing the LBT procedure within the offset before the AF window is in response to receipt of the triggering signal.

4. The method of claim 3, wherein the triggering signal includes one of:
   a downlink control information (DCI) message, wherein the relay node decodes the triggering signal from the DCI message; or
   a predetermined reference signal, wherein the relay node identifies the triggering signal on detection of the predetermined reference signal.

5. The method of claim 4,
   wherein the receipt of the triggering signal includes receiving the triggering signal from one of the serving base station or a neighboring user equipment (UE), and
   wherein the received signals on which the AF operations are performed include one of: received downlink signals from the serving base station or received uplink signals from a neighboring UE.

6. The method of claim 5, wherein the scheduling message is received within a first channel occupancy time (COT) and the AF window is located within a subsequent COT.

7. The method of claim 6, wherein the subsequent COT includes one of:
   a UE-initiated COT when the received signals are received uplink signals from the neighboring UE, or
   a base station-initiated COT when the received signals are received downlink signals from the serving base station.

8. The method of claim 1, further including:
   monitoring, by the relay node, for a triggering signal, wherein the scheduling message further defines an activation of the AF window in response to a receipt of the triggering signal and wherein the AF window identified is at a fixed location associated with the offset from the scheduling message; and
   refraining, by the relay node, from the performing the LBT procedure in response to a failure to receive the triggering signal within the offset, and
   wherein the performing the LBT procedure within the offset before the AF window is in response to the receipt of the triggering signal within the offset.

9. The method of claim 8, wherein the scheduling message defines the activation of the AF window in response to the receipt of the triggering signal within the offset.

10. The method of claim 8, wherein the triggering signal includes one of:
a downlink control information (DCI) message, wherein the relay node decodes the triggering signal from the DCI message; or
a predetermined reference signal, wherein the relay node identifies the triggering signal on detection of the predetermined reference signal.

11. The method of claim 10,
wherein the receipt of the triggering signal includes receiving the triggering signal from one of the serving base station or a neighboring user equipment (UE), and
wherein the received signals on which the AF operations are performed include one of: received downlink signals from the serving base station or received uplink signals from a neighboring UE.

12. The method of claim 11, wherein the scheduling message is received within a first channel occupancy time (COT) and the AF window is located within a subsequent COT.

13. The method of claim 12, wherein the subsequent COT includes one of:
a UE-initiated COT when the received signals are received uplink signals from the neighboring UE, or
a base station-initiated COT when the received signals are received downlink signals from the serving base station.

14. The method of claim 1, wherein the scheduling message further defines a plurality of LBT occasions within the AF window, wherein the performing the LBT procedure and the one of: the refraining from the AF operations, or the performing the AF operations are conducted for each of the plurality of LBT occasions within the AF window.

15. The method of claim 14, wherein the received signals on which the AF operations are performed for each of the plurality of LBT occasions include one of: received downlink signals from the serving base station or received uplink signals from a neighboring UE.

16. The method of claim 1, wherein the received signals on which the AF operations are performed include one of: received downlink signals from the serving base station or received uplink signals from a neighboring user equipment (UE).

17. The method of claim 1, further including:
receiving, by the relay node, an LBT status report scheduling message from the serving base station prior to the scheduling message, wherein the LBT status report scheduling message schedules transmission of a LBT status report one of: periodically or aperiodically.

18. The method of claim 1, further including:
transmitting, by the relay node, an LBT status report to the serving base station, wherein the LBT status report includes a status of the LBT procedure performed by the relay node within the offset.

19. A method of wireless communication performed by a base station, the method comprising:
successfully performing, by the base station, a listen before talk (LBT) procedure to establish a channel occupancy time (COT);
transmitting, by the base station, a scheduling message to a relay node, wherein the scheduling message identifies an amplify and forward (AF) window and an offset prior to a beginning of the AF window; and
transmitting, by the base station, downlink signals to the relay node, wherein the downlink signals are transmitted after a gap period scheduled to allow a relay station LBT procedure.

20. The method of claim 19, further including:
successfully performing, by the base station, a subsequent LBT procedure to establish a subsequent COT, wherein the transmitting the downlink signals occurs during the subsequent COT.

21. A method of wireless communication performed by a user equipment (UE), the method comprising:
obtaining, by the UE, an indication of amplify and forward (AF) operations for communications through a relay node;
receiving, by the UE, an uplink transmission grant allocating uplink resources; and
transmitting, by the UE, uplink signals to the relay node, wherein the uplink signals are transmitted after a gap period scheduled to allow a relay station LBT procedure.

22. The method of claim 21, further including:
successfully performing, by the UE, a listen before talk (LBT) procedure to establish a UE-initiated COT including the uplink resources, wherein the transmitting the uplink signals occurs during the UE-initiated COT.

23. A relay node configured for wireless communication, the relay node comprising:
at least one processor; and
a memory coupled to the at least one processor,
wherein the at least one processor is configured:
to receive, by the relay node, a scheduling message from a serving base station, wherein the scheduling message identifies an amplify and forward (AF) window and an offset prior to a beginning of the AF window;
to perform, by the relay node, a listen before talk (LBT) procedure on a shared communication channel, wherein the LBT procedure is performed within the offset before the AF window;
to refrain, by the relay node, from AF operations within the AF window in response to failure of the LBT procedure; and
to perform, by the relay node, the AF operations on all received signals during the AF window in response to success of the LBT procedure.

24. The relay node of claim 23,
wherein the scheduling message identifies the offset relative to the scheduling message, and
wherein the AF window identified is at a fixed location associated with the offset from the scheduling message.

25. The relay node of claim 23, further including configuration of the at least one processor:
to monitor, by the relay node, for a triggering signal, wherein the scheduling message defines the offset relative to the triggering signal and wherein a location of the AF window floats relative to the triggering signal; and
to refrain, by the relay node, from execution of the configuration of the at least one processor to perform the LBT procedure in response to a failure to receive the triggering signal, and
wherein the configuration of the at least one processor to perform the LBT procedure within the offset before the AF window is in response to receipt of the triggering signal.

26. The relay node of claim 23, further including configuration of the at least one processor:

to monitor, by the relay node, for a triggering signal, wherein the scheduling message further defines an activation of the AF window in response to a receipt of the triggering signal and wherein the AF window identified is at a fixed location associated with the offset from the scheduling message; and to refrain, by the relay node, from execution of the configuration of the at least one processor to perform the LBT procedure in response to a failure to receive the triggering signal within the offset, and wherein the configuration of the at least one processor to perform the LBT procedure within the offset before the AF window is in response to the receipt of the triggering signal within the offset.

27. The relay node of claim 23, wherein the scheduling message further defines a plurality of LBT occasions within the AF window, wherein the configuration of the at least one processor to perform the LBT procedure and the one of: the configuration of the at least one processor to refrain from the AF operations, or the configuration of the at least one processor to perform the AF operations are conducted for each of the plurality of LBT occasions within the AF window.

28. The relay node of claim 23, wherein the received signals on which the AF operations are performed include one of: received downlink signals from the serving base station or received uplink signals from a neighboring user equipment (UE).

29. The relay node of claim 23, further including configuration of the at least one processor:

to receive, by the relay node, an LBT status report scheduling message from the serving base station prior to the scheduling message, wherein the LBT status report scheduling message schedules transmission of a LBT status report one of: periodically or aperiodically.

30. The relay node of claim 23, further including configuration of the at least one processor:

to transmit, by the relay node, an LBT status report to the serving base station, wherein the LBT status report includes a status of the LBT procedure performed by the relay node within the offset.

* * * * *